United States Patent
Kato

(10) Patent No.: US 10,637,895 B2
(45) Date of Patent: Apr. 28, 2020

(54) COMMUNICATION TERMINAL, COMMUNICATION SYSTEM, COMMUNICATION CONTROL METHOD AND PROGRAM

(71) Applicant: Yoshinaga Kato, Kanagawa (JP)

(72) Inventor: Yoshinaga Kato, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 219 days.

(21) Appl. No.: 15/565,569

(22) PCT Filed: May 18, 2016

(86) PCT No.: PCT/JP2016/002433
§ 371 (c)(1),
(2) Date: Oct. 10, 2017

(87) PCT Pub. No.: WO2016/194324
PCT Pub. Date: Dec. 8, 2016

(65) Prior Publication Data
US 2018/0124137 A1 May 3, 2018

(30) Foreign Application Priority Data
May 29, 2015 (JP) .................................. 2015-109871

(51) Int. Cl.
*H04L 12/00* (2006.01)
*H04L 29/06* (2006.01)
(Continued)

(52) U.S. Cl.
CPC ........ *H04L 65/4015* (2013.01); *G06F 3/0488* (2013.01); *G06F 13/00* (2013.01);
(Continued)

(58) Field of Classification Search
CPC ......... G06F 3/0488; G06F 13/00; H04N 7/15; H04N 7/147; H04L 65/1089; H04L 65/403; H04L 65/4015
(Continued)

(56) References Cited

U.S. PATENT DOCUMENTS 7,242,968 B2 * 7/2007 Arakawa ................ G01C 21/26
455/414.1
7,599,495 B2 * 10/2009 Kurihara ................ G06F 21/10
380/201
(Continued)

FOREIGN PATENT DOCUMENTS

| JP | 2015-056030 | 3/2015 |
| JP | 2015-070345 | 4/2015 |

OTHER PUBLICATIONS

International Search Report and Written Opinion dated Aug. 9, 2016, in PCT/JP2016/002433 filed on May 18, 2016.

*Primary Examiner* — Frantz Coby
(74) *Attorney, Agent, or Firm* — Oblon, McClelland, Maier & Neustadt, L.L.P.

(57) ABSTRACT

A communication terminal includes a first communication control unit configured to control a communication between the communication terminal and a first communication terminal via a delivery server; a second communication control unit configured to control a communication between the communication terminal and a second communication terminal; an acquisition unit configured to acquire content data transmitted between the communication terminal and the second communication terminal in the communication controlled by the second communication control unit, the first communication control unit sending the content data acquired by the acquisition unit to the delivery server; and
(Continued)

a display control unit configured to control a display of an image based on content data delivered by the delivery server.

13 Claims, 17 Drawing Sheets

(51) Int. Cl.
*G06F 3/0488* (2013.01)
*H04N 7/15* (2006.01)
*H04N 7/14* (2006.01)
*G06F 13/00* (2006.01)

(52) U.S. Cl.
CPC ........ *H04L 65/1089* (2013.01); *H04L 65/403* (2013.01); *H04N 7/147* (2013.01); *H04N 7/15* (2013.01)

(58) Field of Classification Search
USPC .................................................. 709/204, 203
See application file for complete search history.

(56) References Cited

U.S. PATENT DOCUMENTS

| | | | | |
|---|---|---|---|---|
| 8,396,939 B2 * | 3/2013 | Onda | ............. | G06F 21/10 345/467 |
| 9,596,435 B2 | 3/2017 | Nagahara et al. | | |
| 2003/0040921 A1 * | 2/2003 | Hughes | ............. | G06Q 30/02 705/14.66 |
| 2005/0144644 A1 * | 6/2005 | Hirota | ............. | H04N 5/44543 725/90 |
| 2010/0023959 A1 * | 1/2010 | Bugenhagen | ............. | G06Q 30/02 725/1 |
| 2010/0179816 A1 * | 7/2010 | Wu | ............. | G06Q 10/06 705/1.1 |
| 2012/0265992 A1 * | 10/2012 | Gruschka | ............. | H04L 63/0485 713/176 |
| 2013/0073775 A1 * | 3/2013 | Wade | ............. | G06F 13/4022 710/316 |
| 2013/0076960 A1 * | 3/2013 | Bublitz | ............. | G02B 7/36 348/333.01 |
| 2013/0174276 A1 * | 7/2013 | Nomura | ............. | G06F 21/00 726/28 |
| 2013/0293696 A1 * | 11/2013 | Chang | ............. | H04N 7/18 348/79 |
| 2014/0240440 A1 * | 8/2014 | Seo | ............. | H04L 51/04 348/14.03 |
| 2014/0240526 A1 * | 8/2014 | Chiang | ............. | G06F 1/1698 348/207.1 |
| 2014/0282731 A1 * | 9/2014 | Ito | ............. | H04N 21/26283 725/44 |
| 2015/0002369 A1 * | 1/2015 | Araki | ............. | G06F 3/1438 345/1.1 |
| 2015/0002548 A1 * | 1/2015 | Tsutsumitake | ............. | G09G 5/14 345/635 |
| 2015/0002550 A1 * | 1/2015 | Liu | ............. | G09G 5/373 345/660 |
| 2015/0271467 A1 * | 9/2015 | Weinstock | ............. | H04N 13/282 348/46 |
| 2016/0259434 A1 | 9/2016 | Kato | | |

* cited by examiner

[Fig. 1]
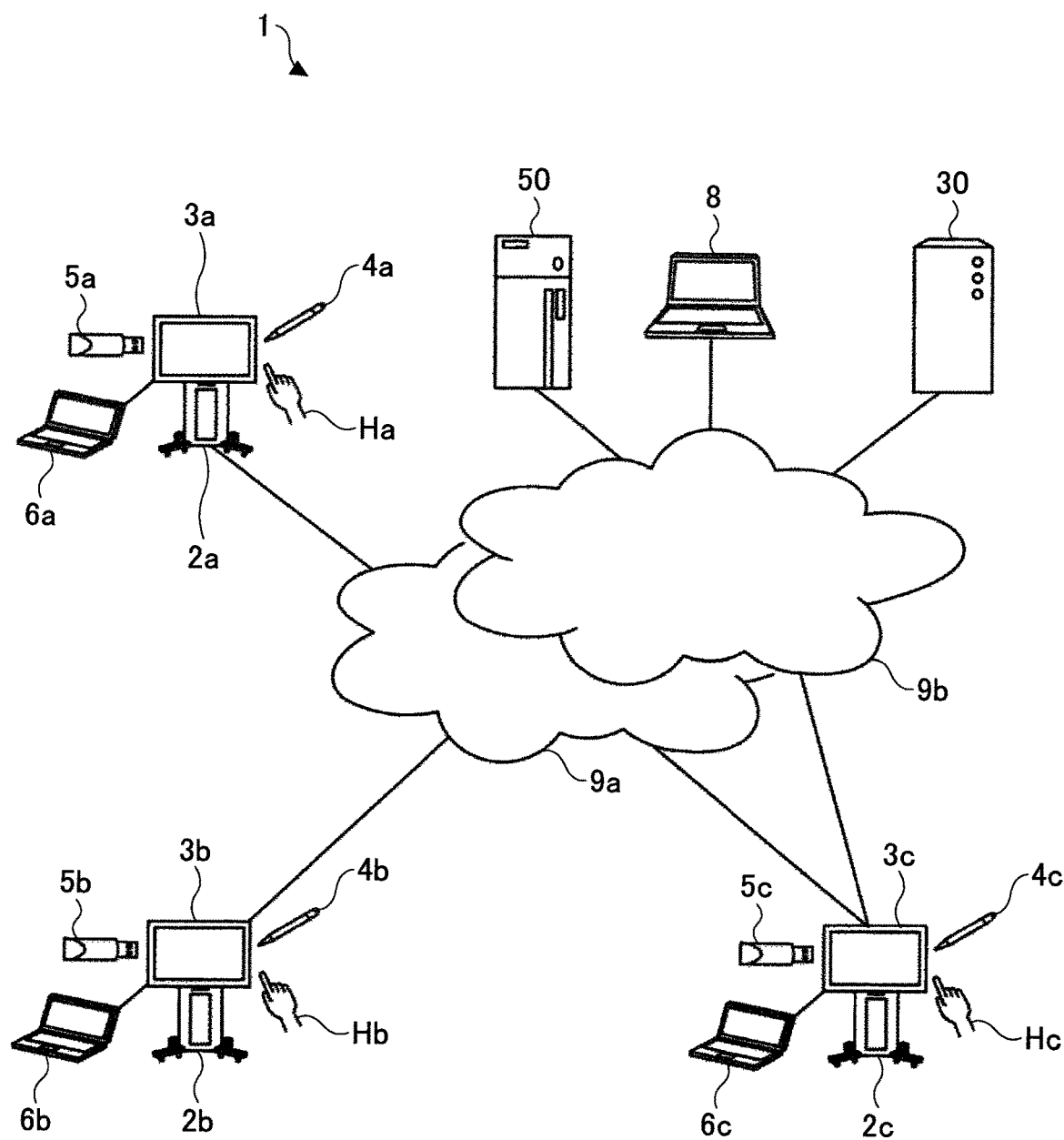

[Fig. 2]
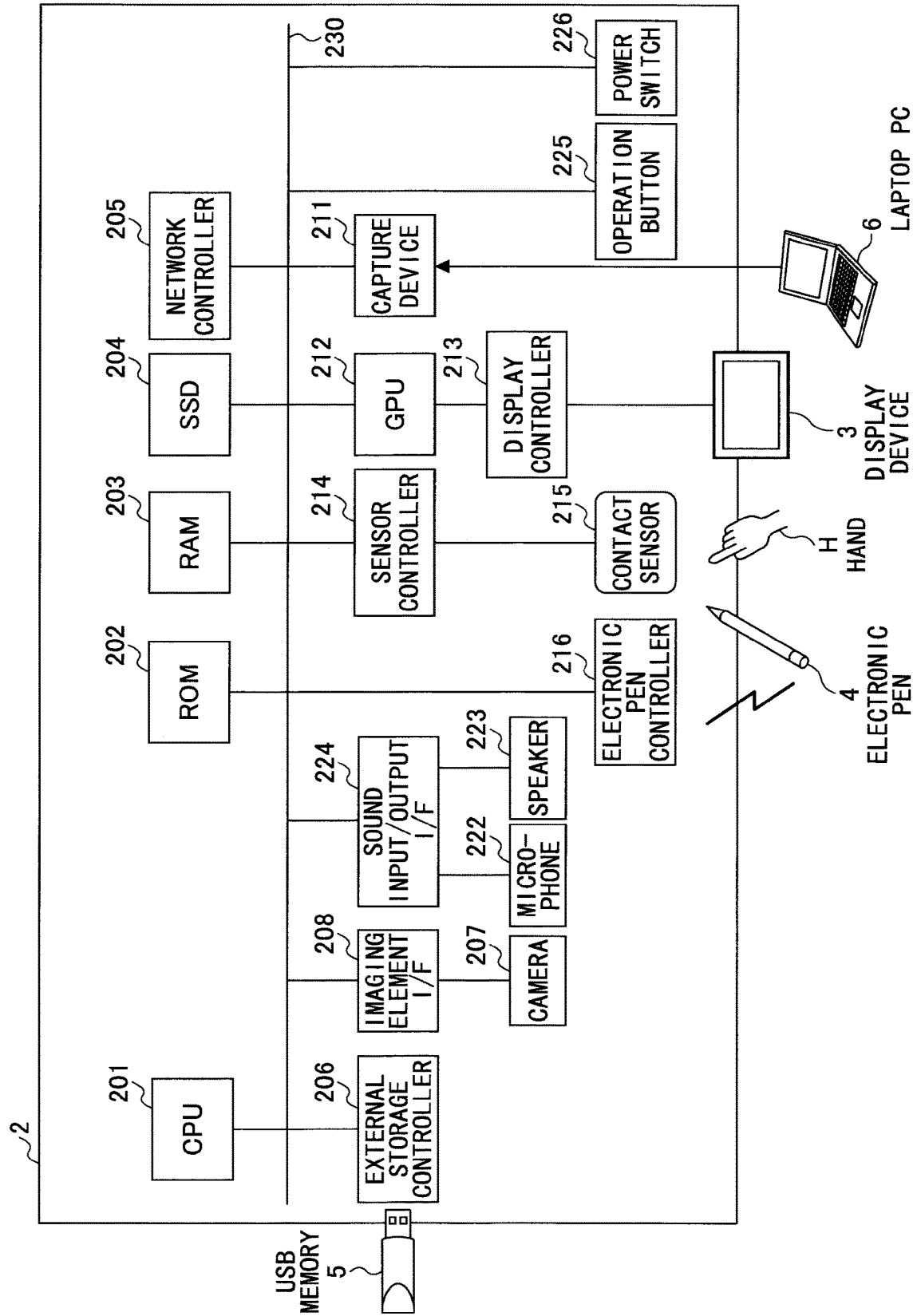

[Fig. 3]
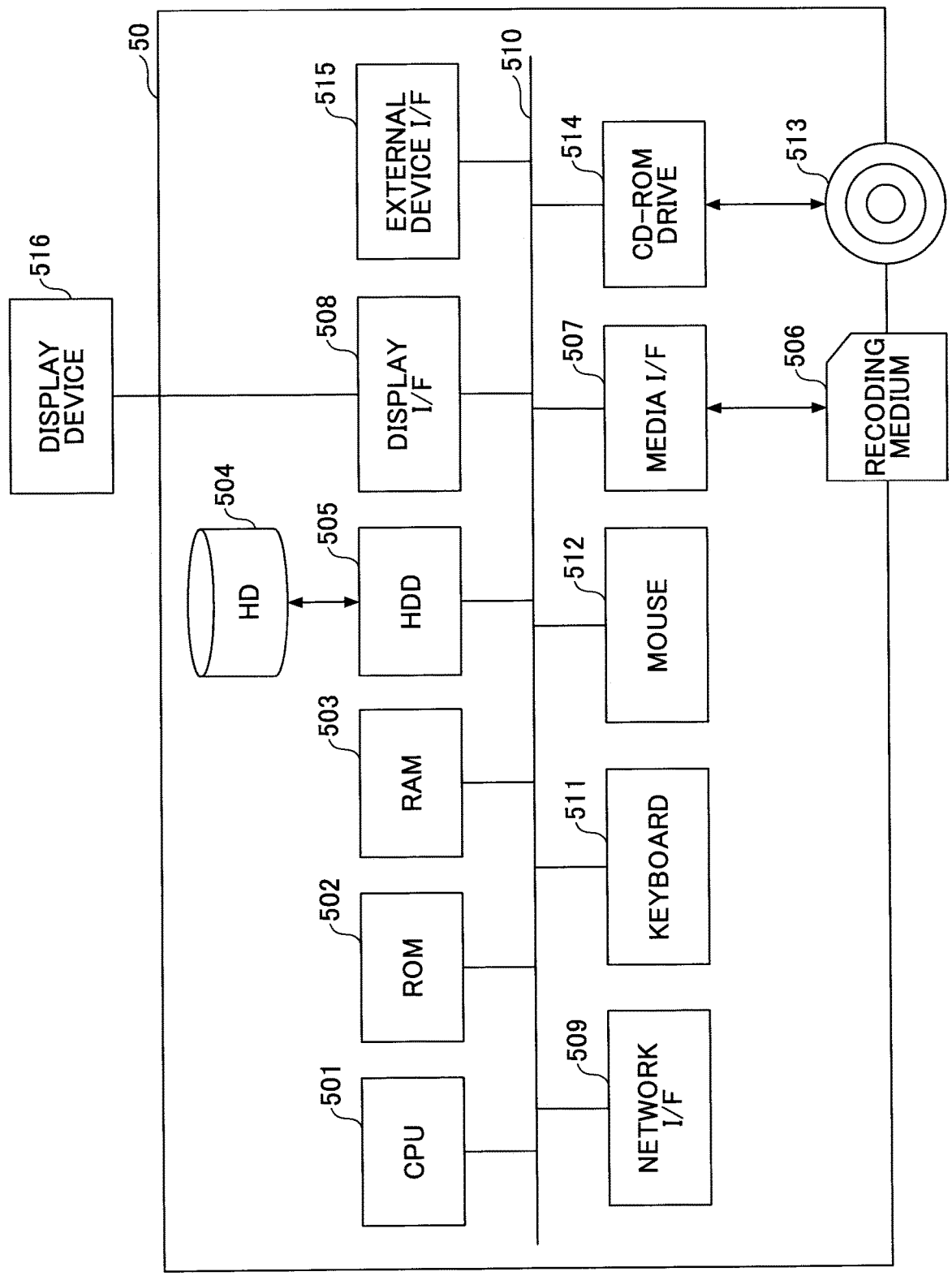

[Fig. 4]
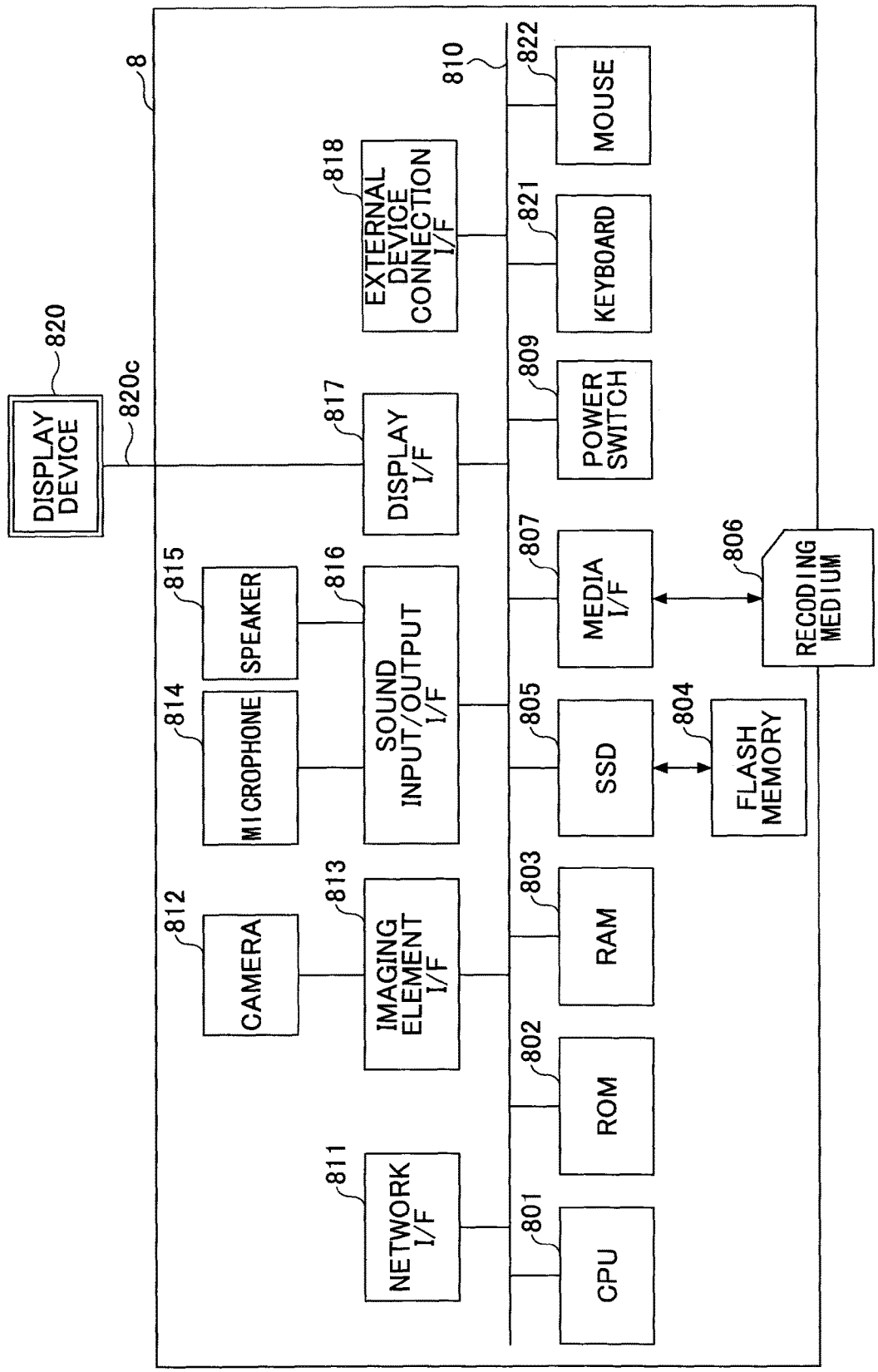

[Fig. 5A]
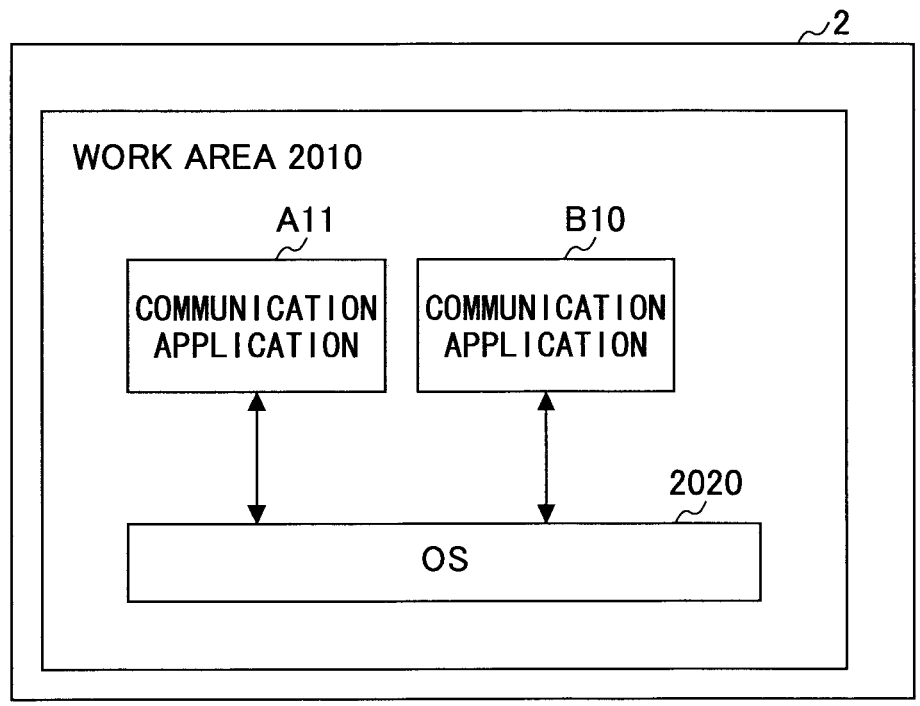
[Fig. 5B]
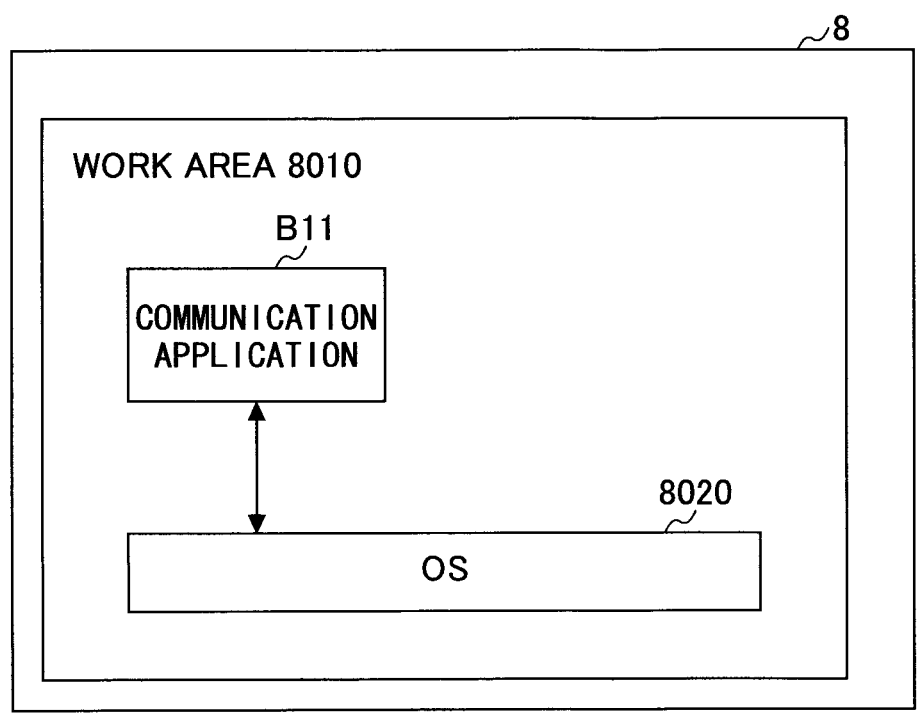

[Fig. 6]
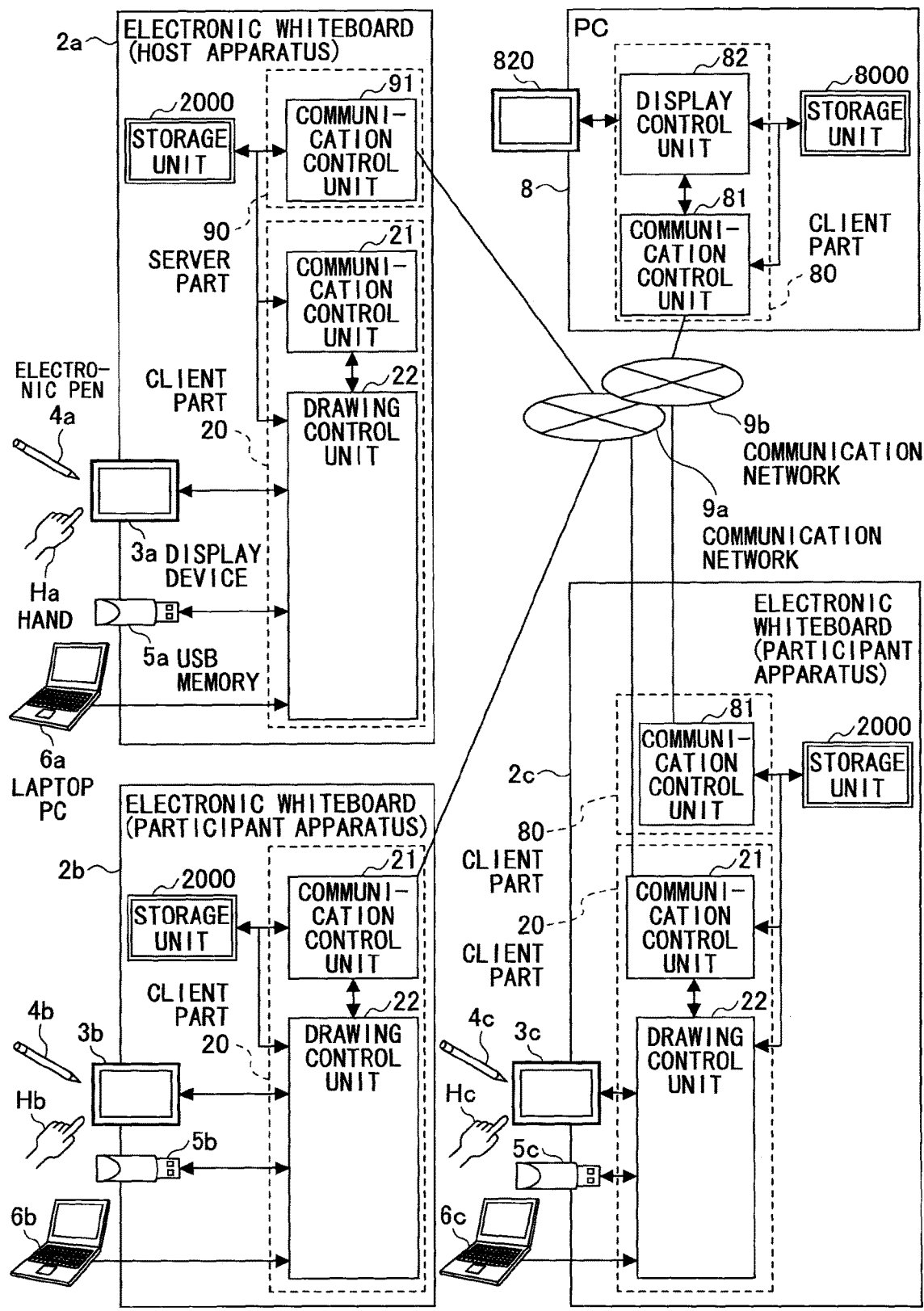

[Fig. 7]
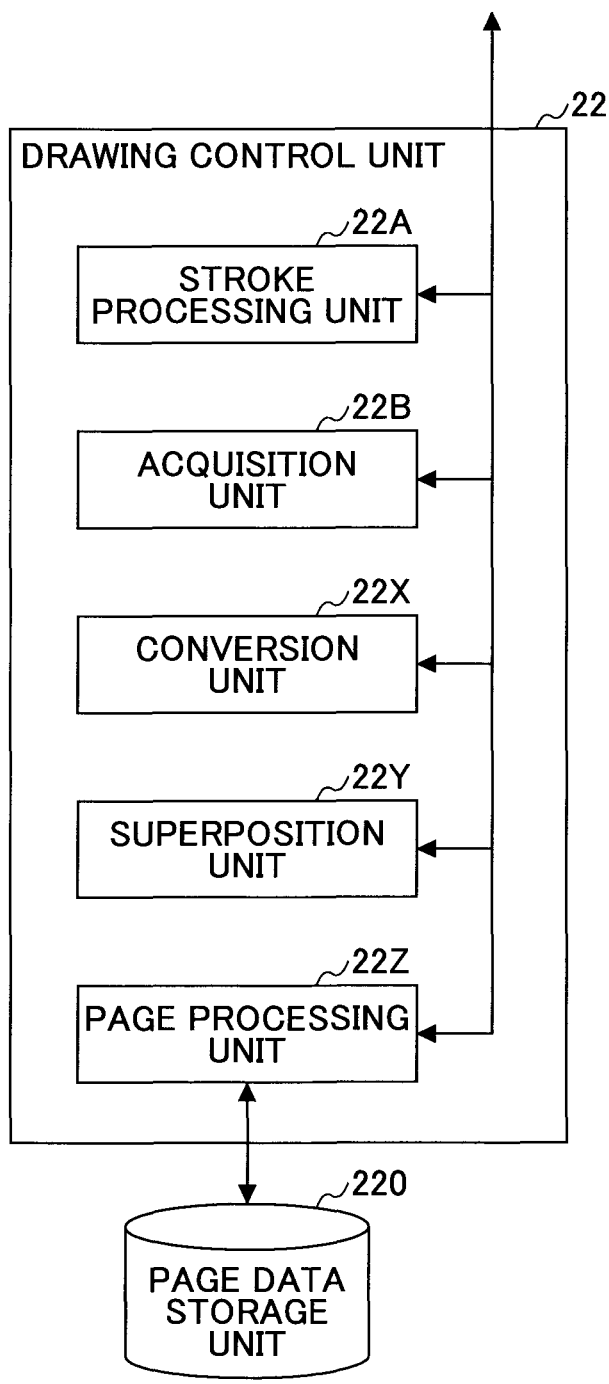

[Fig. 8]
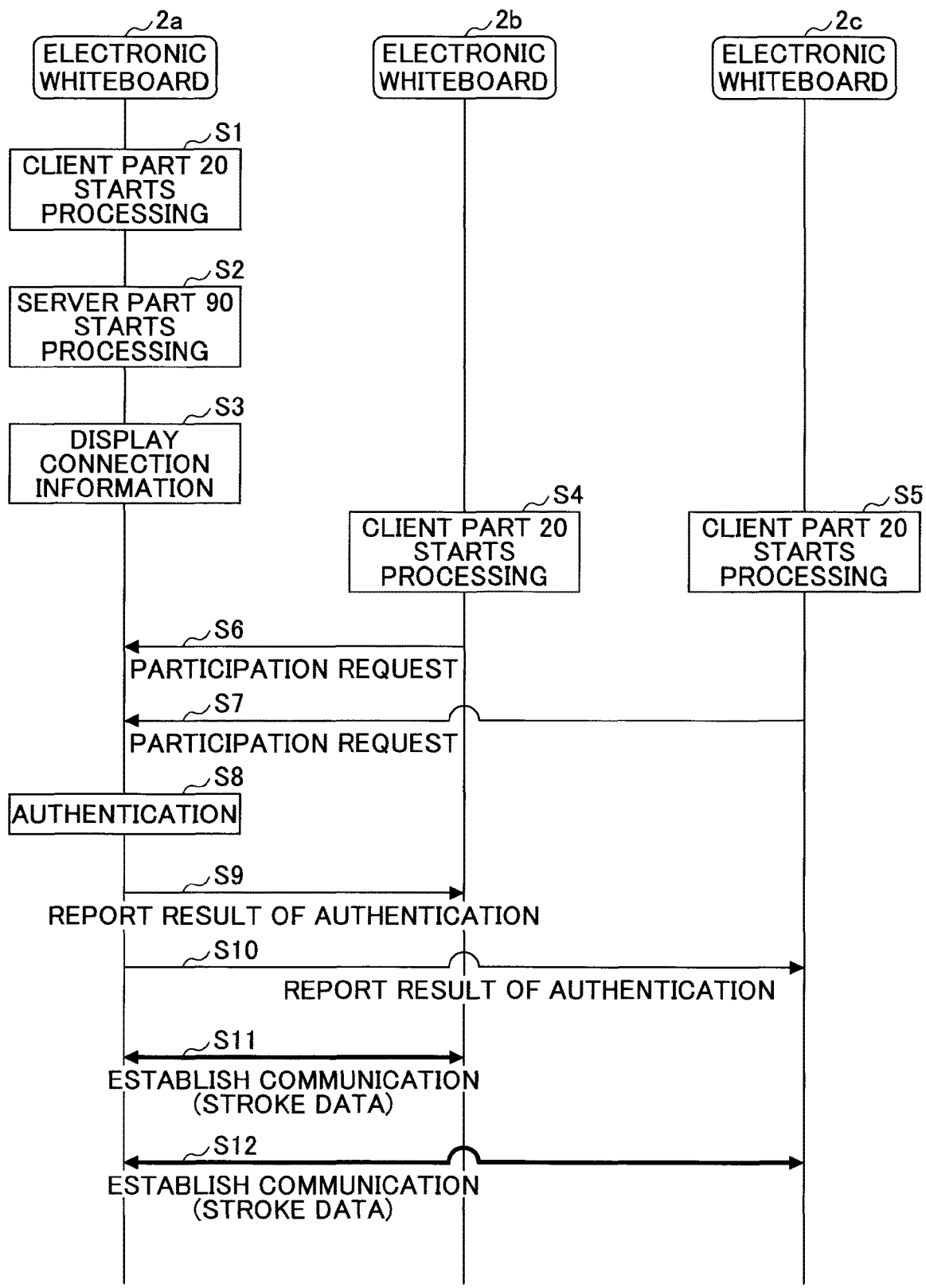

[Fig. 9]
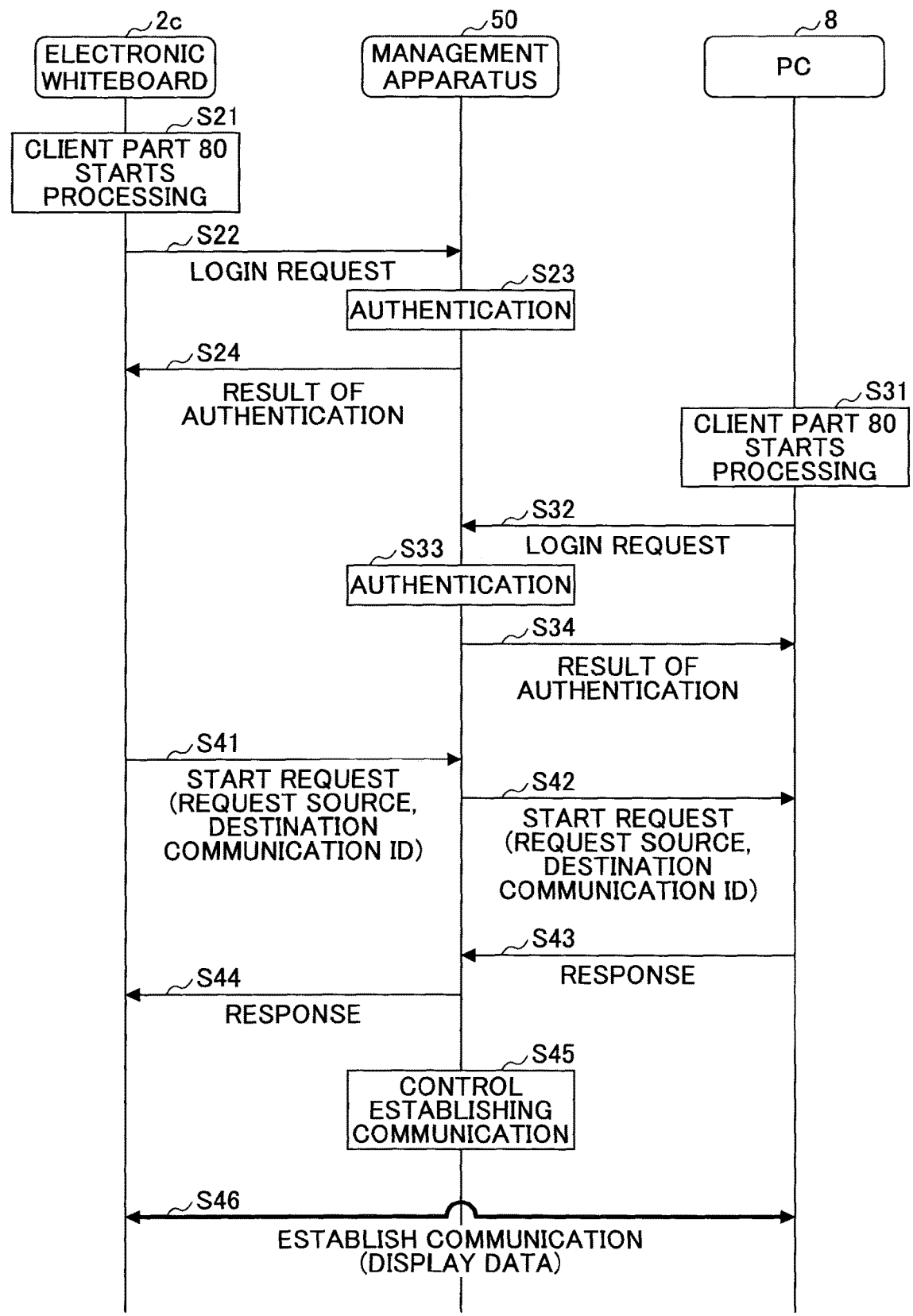

[Fig. 10]
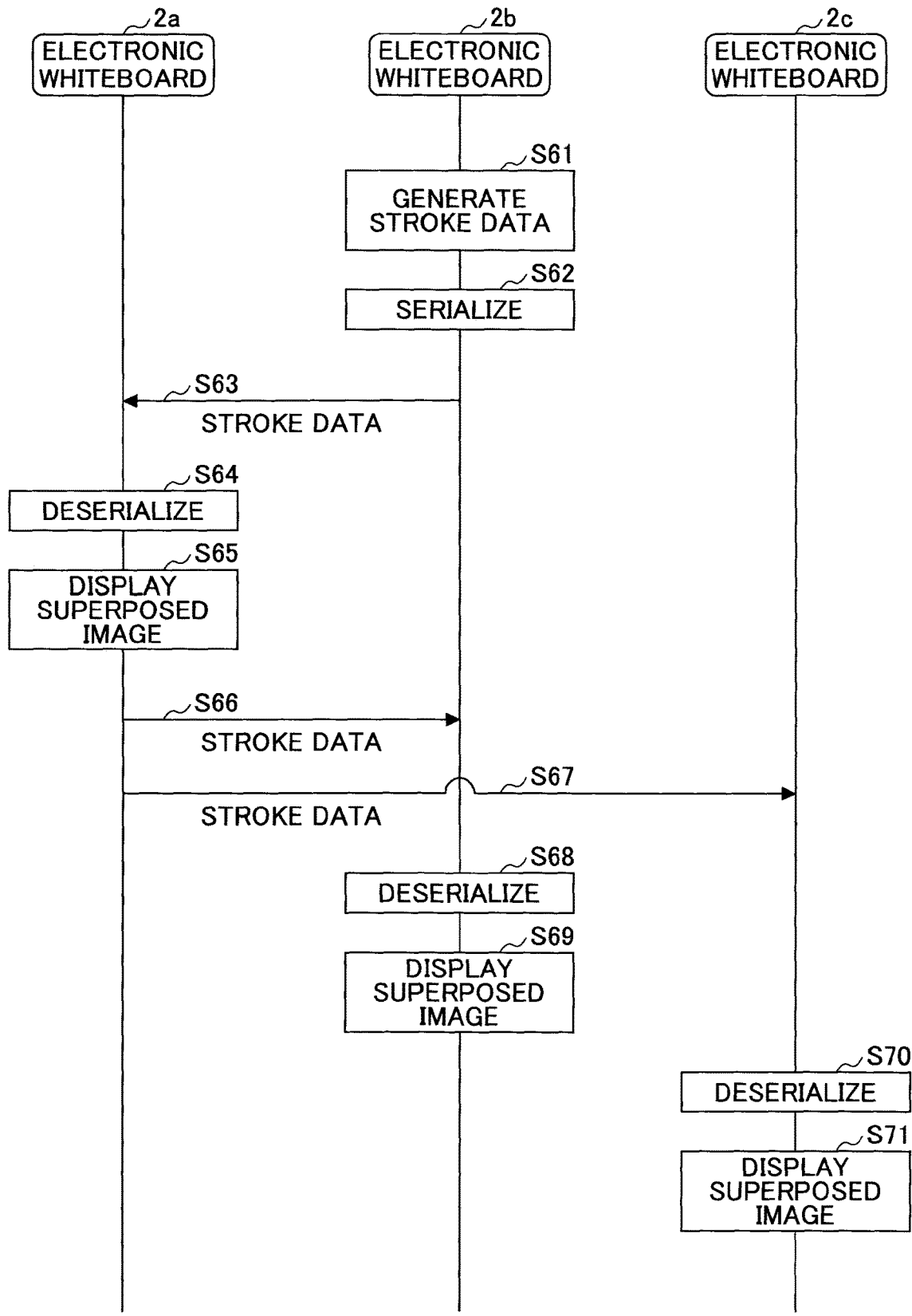

[Fig. 11]
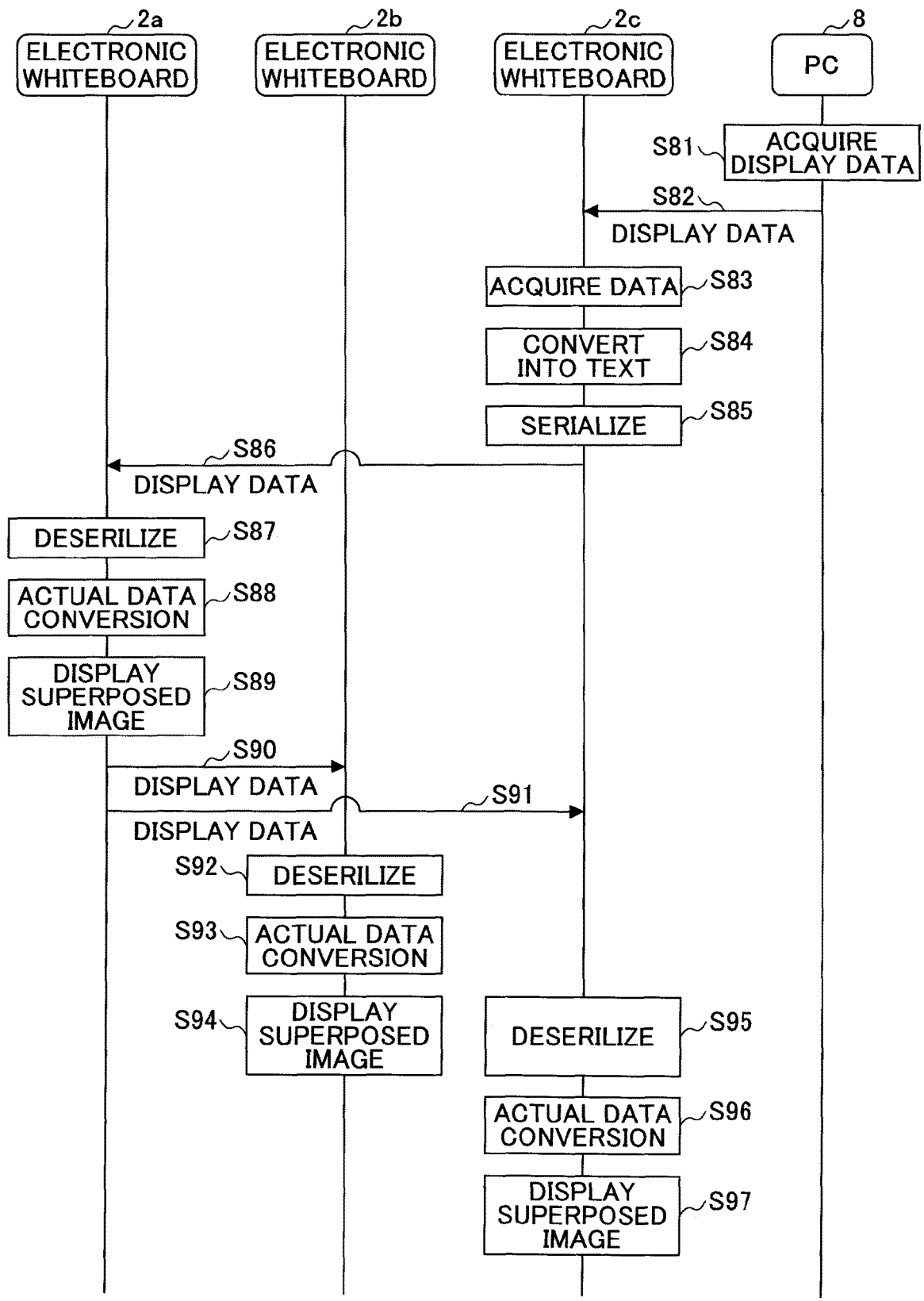

[Fig. 12]
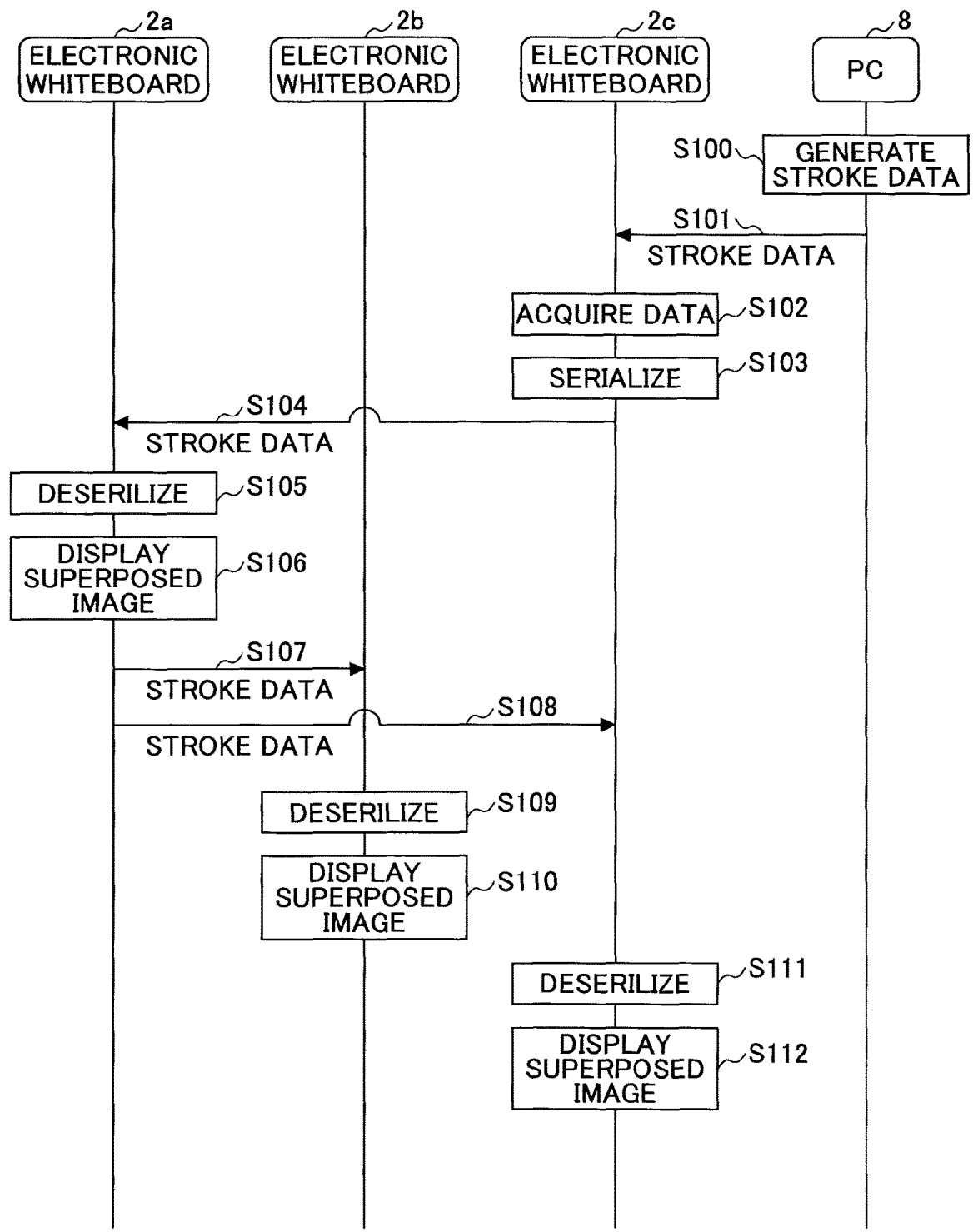

[Fig. 13]
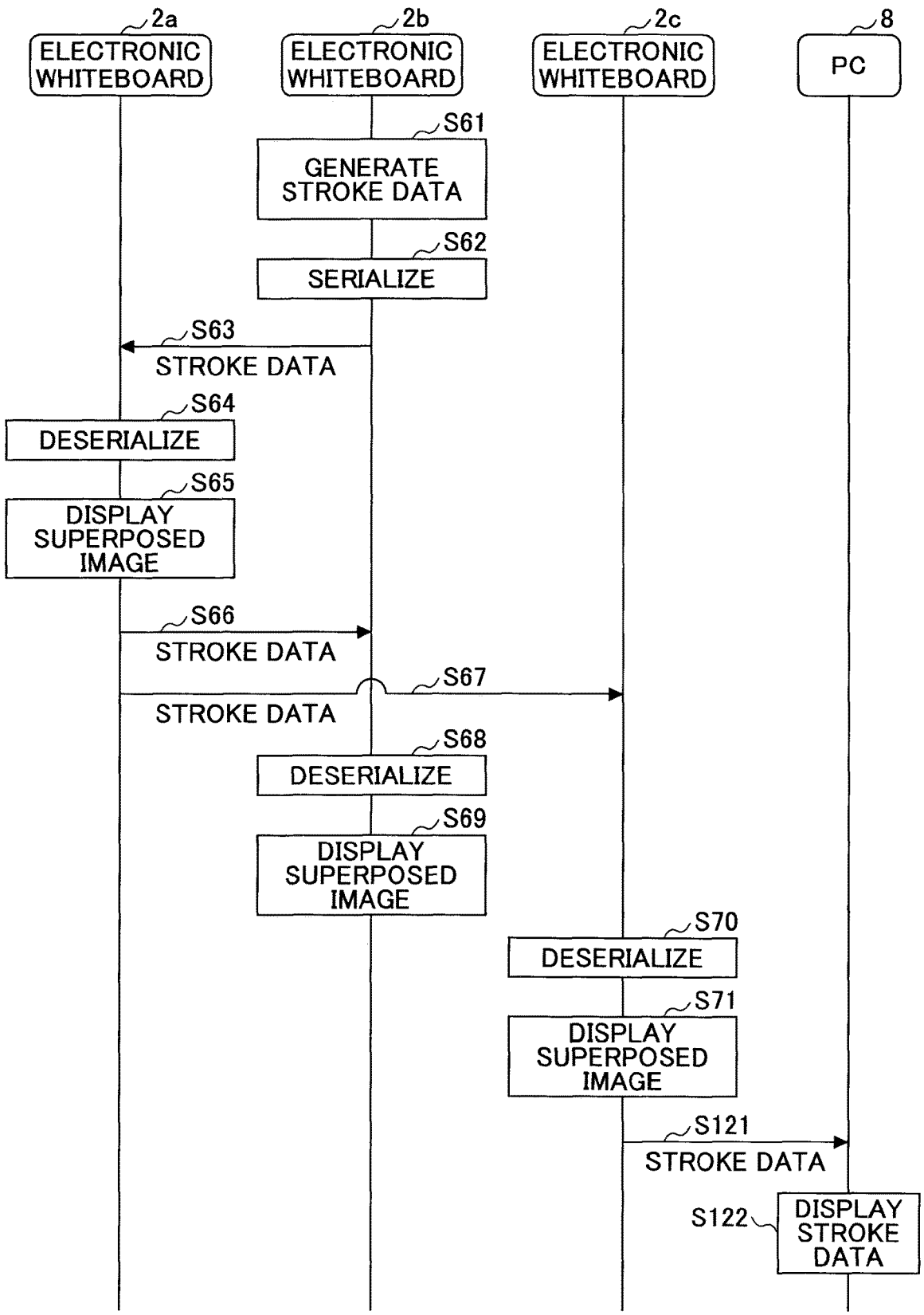

[Fig. 14]
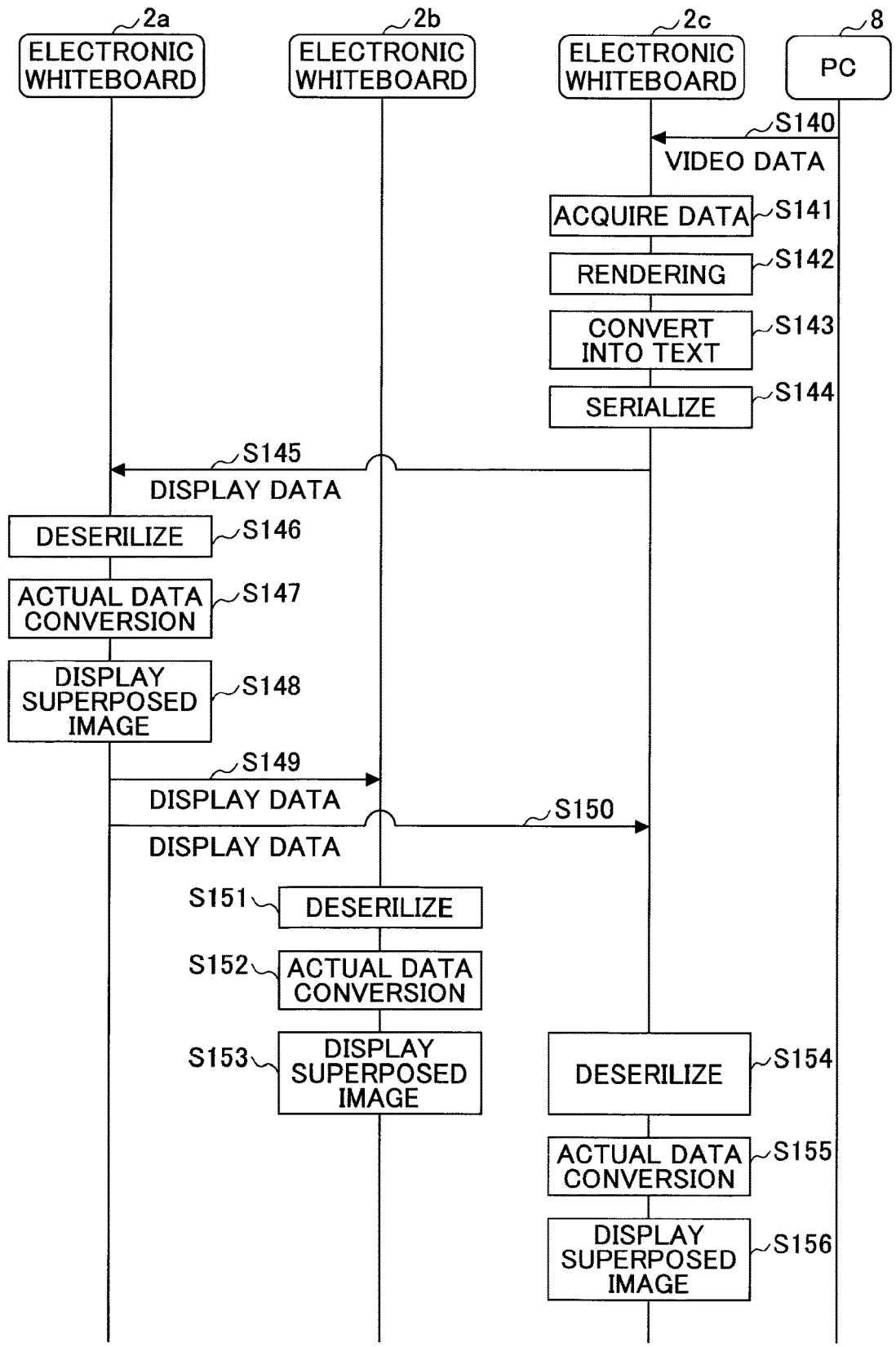

[Fig. 15A]
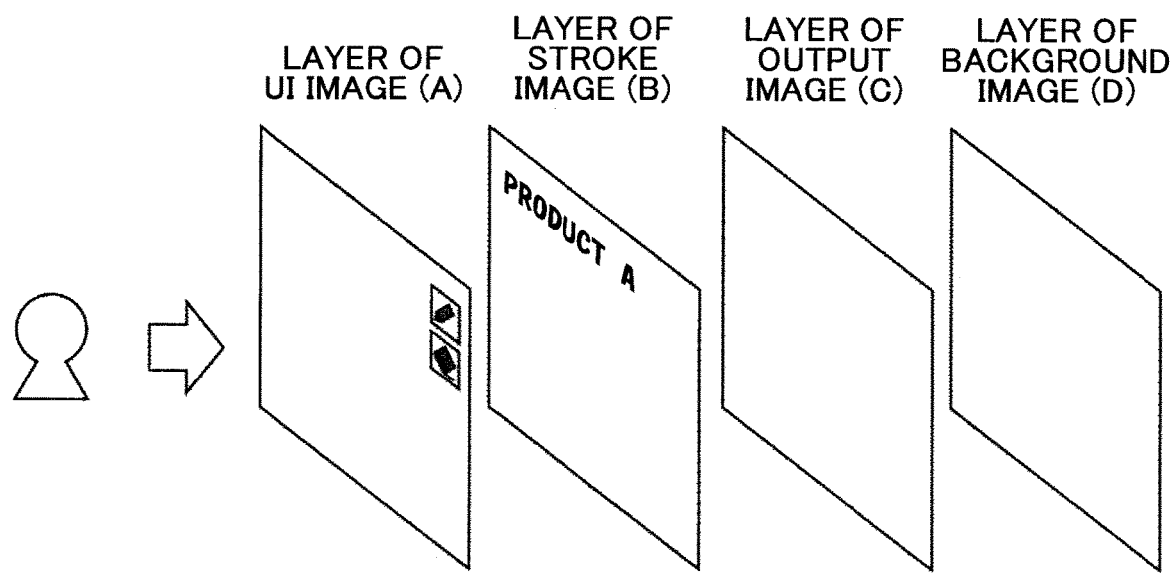
[Fig. 15B]
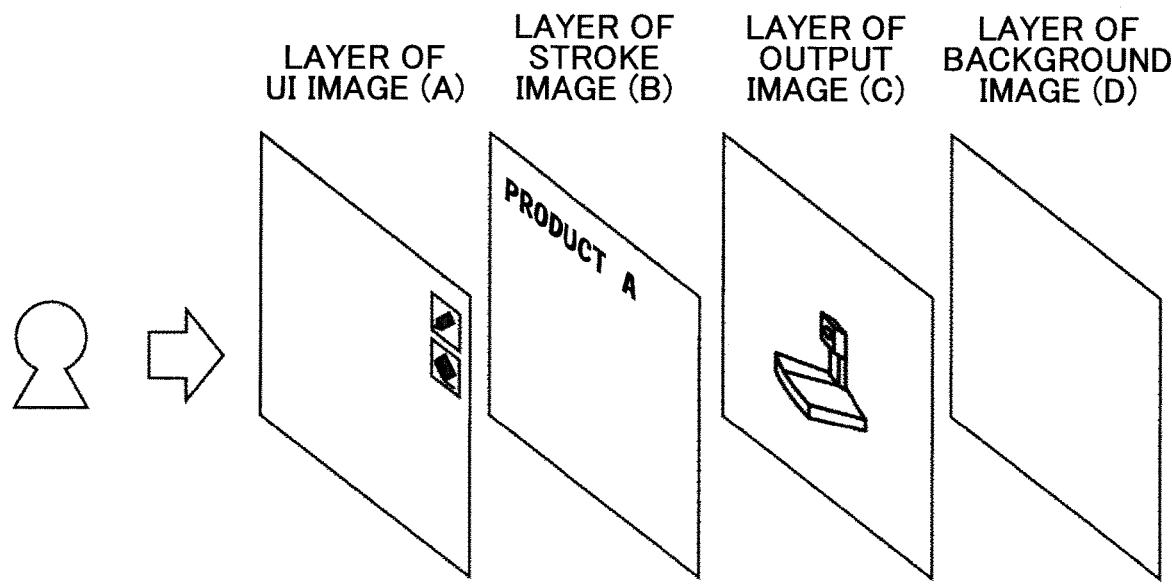

Fig. 17

| X-COORDINATE VALUE | Y-COORDINATE VALUE | DIFFERENCE TIME | c001 WRITING PRESSURE | c002 WRITING PRESSURE | c003 WRITING PRESSURE |
|---|---|---|---|---|---|
| 10 | 10 | 100 | 255 | ... | ... |
| 12 | 10 | 200 | 255 | ... | ... |
| 14 | 12 | 300 | 255 | ... | ... |
| ... | ... | ... | ... | ... | ... |

COMMUNICATION TERMINAL, COMMUNICATION SYSTEM, COMMUNICATION CONTROL METHOD AND PROGRAM

TECHNICAL FIELD

The disclosure herein generally relates to a communication terminal, a communication system, a communication control method and a program.

BACKGROUND ART

Communication systems that perform a telephone call, a video conference or the like via a communication network such as the Internet or a dedicated line have become popular in recent years due to a demand for reducing travel costs and time of parties. In such a communication system, depending of a function that a communication terminal is provided with, content data such as display data of conference participants, conference material or the like, or stroke data based on handwriting operations can be shared among the communication terminals.

Moreover, a method of sharing stroke data between client apparatuses via a server apparatus among electronic whiteboards connected to a communication network has been proposed (See Patent document 1).

CITATION LIST

Patent Literature

PTL 1: Japanese Laid-Open Patent Publication No. 2015-70345

SUMMARY OF INVENTION

Technical Problem

By starting a plurality of functions in a communication terminal, the plurality of functions can be executed at the same timing. However, there is a problem that when a plurality of functions sharing an image between communication terminals are started, an image that can be displayed by one function becomes difficult to be viewed with a display control, such as a pop-up display, by the other function.

Solution to Problem

According to an aspect of the invention, a communication terminal includes a first communication control unit configured to control a communication between the communication terminal and a first communication terminal via a delivery server; a second communication control unit configured to control a communication between the communication terminal and a second communication terminal; an acquisition unit configured to acquire content data transmitted between the communication terminal and the second communication terminal in the communication controlled by the second communication control unit, the first communication control unit sending the content data acquired by the acquisition unit to the delivery server; and a display control unit configured to control a display of an image based on content data delivered by the delivery server.

According to another aspect of the invention, a communication system includes a communication terminal; a first communication terminal; a second communication terminal; and a delivery server. The communication terminal includes a first communication control unit configured to control a communication between the communication terminal and the first communication terminal via the delivery server; a second communication control unit configured to control a communication between the communication terminal and the second communication terminal; an acquisition unit configured to acquire content data transmitted between the communication terminal and the second communication terminal in the communication controlled by the second communication control unit, the first communication control unit sending the content data acquired by the acquisition unit to the delivery server; and a display control unit configured to control a display of an image based on content data delivered by the delivery server.

According to yet another aspect of the invention, a communication control method for controlling a communication of a communication terminal includes controlling a first communication between the communication terminal and a first communication terminal via a delivery server; controlling a second communication between the communication terminal and a second communication terminal; acquiring content data transmitted in the second communication between the communication terminal and the second communication terminal; sending the acquired content data transmitted in the second communication to the delivery server in the first communication; and controlling a display of an image based on content data delivered by the delivery server.

According to yet another aspect of the invention, a program for controlling a communication of a communication terminal includes a first communication control process of controlling a first communication between the communication terminal and a first communication terminal via a delivery server; a second communication control process of controlling a second communication between the communication terminal and a second communication terminal; an acquisition process of acquiring content data transmitted in the second communication controlled by the second communication control process between the communication terminal and the second communication terminal; a transmission process of transmitting the content data acquired by the acquisition process to the delivery server in the first communication; and a display control process of controlling a display of an image based on content data delivered by the delivery server.

According to yet another aspect of the invention, a program for controlling a communication of a communication terminal includes a first communication control process of controlling a first communication between the communication terminal and a first communication terminal via a delivery server; an acquisition process of acquiring content data transmitted in a second communication between the communication terminal and a second communication terminal; a transmission process of transmitting the content data acquired by the acquisition process to the delivery server in the first communication; and a display control process of controlling a display of an image based on content data delivered by the delivery server.

Advantageous Effects of Invention

As described above, according to embodiments of the present invention, an effect is exhibited by which it becomes possible to prevent an image that can be displayed by one function from becoming difficult to be viewed with a display control by the other function, when a plurality of functions sharing an image between communication terminals are started.

BRIEF DESCRIPTION OF DRAWINGS

FIG. 1 is a diagram depicting an example arrangement of a communication system according to a present embodiment.

FIG. 2 is a diagram depicting an example hardware configuration of an electronic whiteboard according to the present embodiment.

FIG. 3 is a diagram depicting an example hardware configuration of a management apparatus according to the present embodiment.

FIG. 4 is a diagram depicting an example hardware configuration of a personal computer (PC) as a video conference terminal according to the present embodiment.

FIG. 5A is a diagram depicting an example software configuration of the electronic whiteboard according to the present embodiment.

FIG. 5B is a diagram depicting an example software configuration of the PC according to the present embodiment.

FIG. 6 is a functional block diagram depicting an example of the electronic whiteboard and the PC constituting a part of the communication system according to the present embodiment.

FIG. 7 is a functional block diagram depicting in detail a drawing control unit according to the present embodiment.

FIG. 8 is a sequence diagram depicting an example of processing of the electronic whiteboard or the PC.

FIG. 9 is a sequence diagram depicting another example of processing of the electronic whiteboard or the PC.

FIG. 10 is a sequence diagram depicting yet another example of processing of the electronic whiteboard or the PC.

FIG. 11 is a sequence diagram depicting yet another example of processing of the electronic whiteboard or the PC.

FIG. 12 is a sequence diagram depicting yet another example of processing of the electronic whiteboard or the PC.

FIG. 13 is a sequence diagram depicting yet another example of processing of the electronic whiteboard or the PC.

FIG. 14 is a sequence diagram depicting yet another example of processing of the electronic whiteboard or the PC.

FIG. 15A is a diagram depicting an example display on a display device.

FIG. 15B is a diagram depicting another example display on a display device.

FIG. 17 illustrates Table 3 showing coordinate array data.

DESCRIPTION OF EMBODIMENTS

Figure 16:
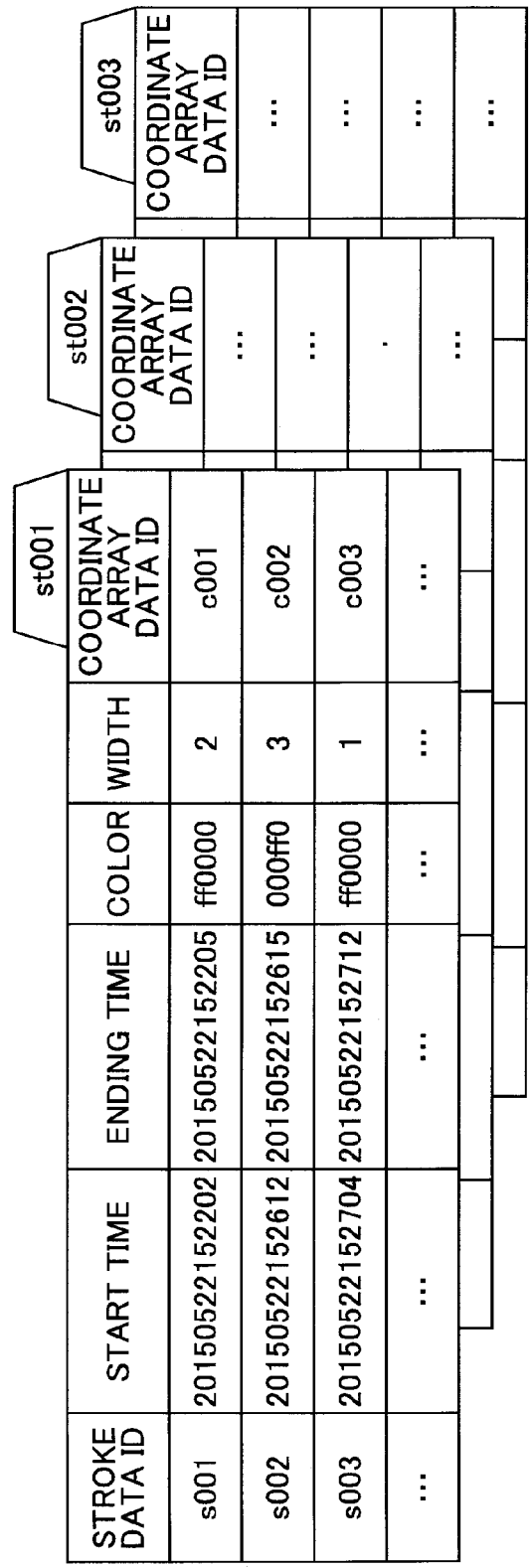
FIG. 16 illustrates Table 2 showing stroke array data.

In the following, embodiments of the present invention will be described with reference to the accompanying drawings.

<<Arrangement of Communication System>>

At first, with reference to FIG. 1, a communication system 1 will be described. FIG. 1 is a diagram depicting an example arrangement of the communication system according to the present embodiment.

The communication system 1 includes a plurality of electronic whiteboards 2*a*, 2*b*, and 2*c*, a PC 8, a relay apparatus 30, and a management apparatus 50.

The electronic whiteboards 2*a*, 2*b*, and 2*c* are connected to each other via a communication network 9*a* for a communications connection. Moreover, the electronic whiteboards 2*a*, 2*b*, 2*c* are provided with display devices 3*a*, 3*b* and 3*c*, respectively.

The electronic whiteboards 2*a*, 2*b*, and 2*c* can display images drawn based on events caused by electronic pens 4*a*, 4*b*, and 4*c* (touches of nibs of the electronic pens 4*a*, 4*b* and 4*c* or other ends of the electronic pens on the display device 3*a*, 3*b* and 3*c*) on the display devices 3*a*, 3*b*, and 3*c*. In addition, the electronic whiteboards 2*a*, 2*b*, and 2*c* can change images displayed on the display devices 3*a*, 3*b*, and 3*c* based on events caused by not only the electronic pens 4*a*, 4*b* and 4*c*, but also user's hands Ha, Hb, and Hc, or the like (gestures such as enlargement, reduction or turning pages). The following description uses the term "electronic whiteboard 2" for indicating an arbitrary one of the electronic whiteboards 2*a*, 2*b*, and 2*c*, the term "display device 3" for indicating an arbitrary one of the display devices 3*a*, 3*b*, and 3*c*, the term "electronic pen 4" for indicating an arbitrary one of the electronic pens 4*a*, 4*b*, and 4*c*, and the term "hand H" for indicating an arbitrary one of the user's hands Ha, Hb and Hc.

Moreover, USB (Universal Serial Bus) memories 5*a*, 5*b*, and 5*c* can be connected to the electronic whiteboards 2*a*, 2*b*, and 2*c*. The electronic whiteboards 2*a*, 2*b*, and 2*c* can read out electronic files such as PDF (Portable Document Format) from the USB memories 5*a*, 5*b*, and 5*c*, and store electronic files into the UBS memories 5*a*, 5*b*, and 5*c*. Moreover, to the electronic whiteboards 2*a*, 2*b*, and 2*c* laptop PCs 6*a*, 6*b*, and 6*c* are connected via cables that enable communication with standards such as DisplayPort, DVI (Digital Visual Interface), HDMI (trademark registered) (High-Definition Multimedia Interface) or VGA (Video Graphics Array). The following description uses the term "USB memory 5" for indicating an arbitrary one of the USB memories 5*a*, 5*b*, and 5*c*, and the term "laptop PC 6" for indicating an arbitrary one of the laptop PCs 6*a*, 6*b* and 6*c*.

In this way, stroke data of strokes drawn on the display device 3 of the electronic whiteboard 2 at one base are transferred to the electronic whiteboard 2 at the other base via the communication network 9*a*, and thereby displayed on the display device 3 at the other base. Conversely, stroke data of strokes drawn on the display device 3 of the electronic whiteboard 2 at the other base are transferred to the electronic whiteboard at the one base via the communication network 9*a*, and thereby displayed on the display device 3 at the one base. In this way, in the communication system 1, it is possible to perform a remote sharing process of sharing the same image at remote locations, and the communication system 1 is quite useful when it is used for a conference or the like at remote locations.

When another communication terminal other than electronic whiteboard is connected to the communication network 9*a*, in addition to the electronic whiteboard 2, the other communication terminal can share stroke data with the electronic whiteboard 2 via the communication network 9*a*. The other communication terminal includes a PC, a video conference terminal, a tablet terminal, a smartphone, a digital signage unit, a telestrator used in a sport relay or a weather forecast, or an image processing apparatus such as a remote image (video) diagnostic device; a portable information terminal, a digital video camera, a digital camera, or a computer such as a terminal that can provide image frames such as a gaming machine.

The electronic whiteboard 2c, the PC (Personal Computer) 8, the relay apparatus 30, and the management apparatus 50 are connected via the network 9b for a communications connection.

The electronic whiteboard 2c and the PC 8 perform communication by sending/receiving display data such as conference material as content data. The display data is image data of an image that can be displayed on the display device. The display data may be moving image data or still image data, and may be both moving image data and still image data.

The relay apparatus 30 performs processing of relaying content data between the electronic whiteboard 2c and the PC 8. The management apparatus 50 manages in an integrated fashion communication statuses of the electronic whiteboard 2c and the PC 8.

By using another communication terminal other than the electronic whiteboard 2c and the PC 8 connecting to the communication network 9b, the other communication terminal can share display data with the electronic whiteboard 2c and the PC 8 via the communication network 9b. The other communication terminal includes a video conference terminal, a tablet terminal, a smartphone, a digital signage unit, a telestrator, or an image processing apparatus; a portable information terminal, a digital video camera, a digital camera, or a computer such as a terminal that can provide image frames such as a gaming machine.

The electronic whiteboard 2c can share simultaneously both stroke data and display data with a communication terminal by starting both a module for sharing the stroke data and a module for sharing the display data.

According to the present embodiment, the communication network 9a is an intranet, and the communication network 9b is the Internet. However, the communication networks 9a and 9b are selected from arbitrary networks such as the Internet, a LAN (local area network), an intranet, or a mobile telephone network. Alternatively, the communication networks 9a and 9b may be the same communication network such as a case where they are the Internet.

Moreover, according to the present embodiment, as an example of a recording medium, the USB memory will be described. However, the present invention is not limited to this. The recording medium may be, as another example, various recording media such as an SD card.

<Hardware Configuration of Electronic Whiteboard>

With reference to FIG. 2, a hardware configuration of an electronic whiteboard according to the embodiment will be described. FIG. 2 is a hardware configuration diagram of the electronic whiteboard according to the present embodiment.

As shown in FIG. 2, the electronic whiteboard 2 includes a CPU (central processing unit) 201 for controlling an overall operation of the electronic whiteboard 2, a ROM (read-only memory) 202 for storing a program such as IPL used for starting the CPU 201, a RAM (random access memory) used for a work area of the CPU 201, an SSD (solid state drive) 204 for storing various data such as a program for the electronic whiteboard, a network controller 205 for controlling communication with the communication network 9, and an external storage controller 206 for controlling communication with the USB memory 5. The electronic whiteboard 2 further includes a camera 207 for capturing a subject according to a control by the CPU 201, an imaging element I/F 208 for controlling driving the camera 207, a capturing device 211 for causing a display unit of the laptop PC 6 to display video information as a still image or a moving image, a GPU (graphics processing unit) 212 that specializes in graphical processes, and a display controller 213 for controlling and managing screen display for outputting an output image from the CPU 201 to the display device 3. The electronic whiteboard 2 further includes a sensor controller 214 for controlling processing of a contact sensor 215, and the contact sensor 215 for detecting that the electronic pen 4, the user's hand H or the like contacts on the display device 3. The contact sensor 215 according to the embodiment inputs and detects coordinates by an infrared light interruption method. This method of inputting and detecting coordinates is a method of emitting a plurality of infrared light beams parallel to the display device 3 from two reception/emission light devices arranged at respective ends of an upper side of the display device 3 and receiving light that is reflected on a reflection member arranged around the display device 3 and returned on an optical path which is the same as the optical path of the emitted light beam by a light receiving element. The contact sensor 215 outputs ID (identification) of the infrared light beams emitted from the two reception/emission light devices and interrupted by a body to the sensor controller 214. The sensor controller 214 identifies a coordinate position that is a contact position by the body. All of the respective IDs, shown below, are examples of identification information.

The contact sensor 215 is not limited to the infrared light interruption method, but various detection means may be used such as a touch panel of a capacitance method that identifies a contact position by detecting a change in a capacitance, a touch panel of a resistance film method that identifies a contact position by a change in an electric voltage between two opposed resistance films, or a touch panel of an electromagnetic induction that identifies a contact position by detecting electromagnetic induction generated by the contact body contacting the display unit. Moreover, the contact sensor 215 may determine a contact by using a camera to identify a coordinate position.

The electronic whiteboard 2 further includes an electronic pen controller 216. The electronic pen controller 216 determines a presence of a touch of a pen nib or the other end of the pen on the display device 3 by communicating with the electronic pen 4. The electronic pen controller 216 may determine a presence of a touch of a part of the electronic pen 4 where the user holds or the other part of the electronic pen, not only the pen nib or the other end of the electronic pen 4.

Furthermore, the electronic whiteboard 2 includes a microphone 222 for inputting voice, a speaker 223 for outputting voice, a sound input/output I/F 224 for processing input/output of the sound between the microphone 222 and the speaker 223 according to a control by the CPU 101, an operation button 225 for accepting a user's operation, and a power switch 226 for switching ON/OFF the electric power of the electronic whiteboard 2.

Furthermore, the electronic whiteboards 2 includes a bus line 230 such as an address bus or a data bus for electrically connecting the respective above-described members to each other.

A program for electronic whiteboard may be stored in a recording medium such as a CD-ROM readable by a computer or a server on a network, to be distributed or downloaded.

<Hardware Configuration of Management Apparatus>

With reference to FIG. 3, a hardware configuration of the management apparatus according to the present embodiment will be described. FIG. 3 is a hardware configuration diagram of the management apparatus according to the present embodiment.

The management apparatus 50 includes a CPU 501 that controls the overall operation of the management apparatus 50, a ROM 502 that stores a program for transmission management, a RAM 503 used as a work area for the CPU 501, an HD (hard disk) 504 that stores various data, a hard disk drive (HDD) 505 that controls reading/writing of various data from/to the HD 504 under control of the CPU 501, and a medium I/F 507 that controls reading/writing (storage) of data from/to a recording medium 506 such as a flash memory. Furthermore, the management apparatus 50 includes a display I/F 508 for displaying various information items such as a cursor, a menu, a window, characters or an image on a display unit 516, a network I/F 509 for transmitting data using the communication network 9, a keyboard 511 including a plurality of keys for entering characters, numerals, various instructions or the like, and a mouse 512 that performs selection and execution of various instructions, selection of a processing target, movement of a pointing device such as a mouse cursor or the like. The management apparatus 50 further includes a compact disc read-only memory (CD-ROM) drive 514 that controls reading/writing of various data from/to a CD-ROM 513 serving as an example of a removable recording medium, an external device I/F 515 for sending/receiving information to/from an external device, and a bus line 510 such as an address bus and a data bus for electrically connecting the above-described elements.

Moreover, the above-described program for transmission management may be stored in a recording medium readable by a computer such as the above-described medium 506 or the CD-ROM 513 and distributed in a file in an installable format or in an executable format. The above-described program for transmission management may be stored in the HD 504.

<Hardware Configuration of PC>

FIG. 4 is a hardware configuration diagram of the PC 8 as a video conference terminal according to the embodiment. The PC 8 includes a CPU 801, a ROM 802, a RAM 803, a flash memory 804, an SSD 805, a media I/F 807, a power switch 809, a bus line 810, a network I/F 811, a camera 812, an imaging element I/F 813, a microphone 814, a speaker 815, a sound input/output I/F 816, a display I/F 817, an external device connection I/F 818, a keyboard 821, and a mouse 822. Among them, the CPU 801 controls an overall operation of the PC 8. The ROM (Read Only Memory) 802 stores a program used for driving the CPU 801, such as IPL (Initial Program Loader). The RAM (Random Access Memory) is used as a work area of the CPU 801. The flash memory 804 stores various data such as a program for communication, display data, sound data or the like. The SSD (Solid State Drive) 805 controls reading/writing various data from/to the flash memory 804 under control of the CPU 801. An HDD may be used instead of the SSD. The media I/F 807 controls reading/writing (storage) data from/to the recording medium 806 such as a flash memory.

Moreover, the network I/F (interface) 811 is an interface for performing data communication using the communication network 9b. The camera 812 is a kind of a built-in capturing means for capturing a subject according to a control by the CPU 801 to obtain display data. The imaging element I/F 813 is a circuit for controlling driving the camera 812. The microphone 814 is a kind of built-in sound collecting means for inputting voice. The sound input/output I/F 816 is a circuit for inputting/outputting a sound signal between the microphone 814 and the speaker 815 according to a control by the CPU 801. The display I/F 817 is a circuit for sending display data to an external display device 820 according to a control by the CPU 801. The external device connection I/F 818 is an interface for connecting various external devices. The keyboard 821 includes a plurality of keys for inputting characters, numerical values, various instructions or the like. The mouse 822 performs selection and execution of various instructions, selection of a processing target, movement of a pointing device such as a mouse cursor or the like.

Moreover, the bus line 810 is an address bus, a data bus or the like for electrically connecting respective members, shown in FIG. 4, such as the CPU 801.

The display device 820 is a kind of display means for displaying an image of a subject, an icon for operation or the like, made of a liquid crystal or an organic EL. Moreover, the display device 820 is connected to the display I/F 817 via a cable 820c. This cable 820c may be a cable for an analog RGB (VGA) signal, a cable for a component video, or a cable for the HDMI (trademark registered) (High-Definition Multimedia Interface) or DVI (Digital Video Interactive) signal.

The camera 812 includes a lens, and a solid-state imaging element that converts light into an electric signal to digitize the image (video) of the subject. As the solid-state imaging element, CMOS (Complementary Metal Oxide Semiconductor), CCD (Charge Coupled Device) or the like is used. To the external device connection I/F 818, external devices such as an external camera, an external microphone, an external speaker and the like can be connected via a USB (Universal Serial Bus) or the like. When the external camera is connected, according to the control by the CPU 801, the external camera is activated in preference to the built-in camera 812. Similarly, when the external microphone or the external speaker is connected, according to the control by the CPU 801, the external microphone or the external speaker is activated in preference to the built-in microphone 814 or the built-in speaker 815.

Moreover, the recording medium 806 is detachable from the PC 8. The flash memory 804 may be replaced by an EEPROM (Electrically Erasable and Programmable ROM), as long as it is a non-volatile memory from which data can be read or to which data can be written according to the control of the CPU 801.

<Software Configuration>

FIG. 5A is a software configuration of the electronic whiteboard according to the present embodiment. As shown in FIG. 5A, an OS (operating system) 2020, a communication application A11, and a communication application B10 operate in a work area 2010 of the RAM 203.

The OS 2020 is basic software that provides a basic function and manages overall the electronic whiteboard. The communication applications A11 and B10 are applications for performing communications with the other terminal, and have communication protocols which are different from each other. The communication application A11 causes the electronic whiteboard 2 to perform a communication control function for sending stroke data to the other communication terminal, and an image processing function for outputting the stroke data as an image. On the other hand, the communication application B10 causes the electronic whiteboard 2 to perform a communication control function for sending display data such as video conference material to the other communication terminal. In contrast, the communication application B10 is not provided with the image processing function for outputting display data. The communication application B10 may be, for example, an application obtained by removing the image processing function by using a software development kit from a communication application B11 which is provided with both the communication control function and the image processing function regarding display data.

The OS 2020 and the communication application A11 have been installed in the electronic whiteboard 2 prior to factory shipment. Moreover, the communication application B10 can be arbitrarily installed in the electronic whiteboard 2 after factory shipment. In the following description, it is assumed that the communication application B10 is installed in the electronic whiteboard 2c and the communication application B10 is not installed in the electronic whiteboards 2a and 2b.

FIG. 5B is a software configuration diagram of the PC according to the embodiment.

As shown in FIG. 5B, the OS 8020 and the communication application B11 operate in a work area 8010 of the RAM 803.

The OS 8020 is basic software that provides a basic function and manages overall the PC 8. The communication application B11 causes the PC 8 to perform a communication control function for sending display data such as conference material to the other communication terminal, and an image processing function for outputting the display data as an image.

Moreover, the OS 8020 and the communication application B11 are installed in the PC 8 prior to factory shipment or after factory shipment.

<<Functional Configuration of Embodiment>>

Next, a functional configuration of the communication system according to the embodiment will be described. FIG. 6 is a functional block diagram of an electronic whiteboard and a PC which form a part of the communication system according to the embodiment. In FIG. 6, electronic whiteboards 2a, 2b and 2c are connected to each other so that data communication can be performed via a communication network 9a. Moreover, in FIG. 6, the electronic whiteboard 2c and the PC 8 are connected to each other so that data communication can be performed via the communication network 9b.

The electronic whiteboard 2 enables respective functional configurations shown in FIG. 6 by the hardware configuration in FIG. 2 and a program. Moreover, the electronic whiteboard 2 includes a storage unit 2000 formed with the SSD 204. The PC 8 enables functional configurations shown in FIG. 6 by the hardware configuration in FIG. 4 and a program. Moreover, the PC 8 includes a storage unit 8000 formed with the SSD 805.

The electronic whiteboard 2 can be a "host apparatus" that first starts remote sharing processing, and can be a "participant apparatus" that participates in the remote sharing processing which has been already started. Moreover, the electronic whiteboard 2 includes roughly two parts, i.e. a client part 20 and a server part 90. The client part 20 and the server part 90 are functions enabled by the communication application A11 starting in a chassis of the electronic whiteboard 2. In addition, the electronic whiteboard 2 may be provided with the client part 20, and the server 90 may be arranged in an apparatus different from the electronic whiteboard 2, such as a distribution control apparatus.

When the electronic whiteboard 2 is the host apparatus, in the electronic whiteboard 2, the client part 20 and the server part 90 are enabled (executed). Moreover, when the electronic whiteboard 2 is the participant apparatus, in the electronic whiteboard 2, the client part 20 is enabled (executed), but the server part 90 is not enabled (executed). That is, when the electronic whiteboard 2a is the host apparatus and the electronic whiteboards 2b and 2c are the participant apparatuses, the client part 20 of the electronic whiteboard 2a communicates with the client parts 20 of the other electronic whiteboards via the server part 90 which is enabled in the same electronic whiteboard 2a. On the other hand, the client parts 20 of the electronic whiteboards 2b and 2c communicate with the client part of the other electronic whiteboard 2a, 2b or 2c, via the server part 90 enabled in the other electronic whiteboard 2a.

Moreover, in the electronic whiteboard 2b and the PC 8, the client part 80 is enabled by the communication applications B10 and B11 starting. The client part 80 communicates with the other client part 80 of the other communication terminal via the relay apparatus 30 in a communication established by a call control of the management apparatus 50 as a server.

((Functional Configuration of Client Part 20))

The client part 20 includes a communication control unit 21 and a drawing control unit 22.

The communication control unit 21 is enabled by an instruction from the CPU 201 or the network controller 205, and controls a communication with the other electronic whiteboard 2 via the communication network 9a or a communication with a communication control unit 91, which will be described later, in the server part 90.

The drawing control unit 22 is enabled by the instruction from the CPU 201, and performs image processing based on stroke data generated by an operation on the display device 3 or data acquired from the USB memory 5, the laptop PC 6, the communication control unit 21, the storage unit 2000 or the like. Moreover, the drawing control unit 22 performs control for generating an image layer based on the processed data and outputting a superposed image in which they are superposed.

FIG. 7 is a functional block diagram depicting the drawing control unit according to the embodiment in detail. The drawing control unit 22 includes a stroke processing unit 22A, an acquisition unit 22B, a conversion unit 22X, a superposition unit 22Y, and a page processing unit 22Z.

The stroke processing unit 22A is enabled by the instruction from the CPU 201, and when an event of stroke drawing occurs by an operation of the electronic pen 4 or a hand H on the display device 3, the stroke processing unit 22A performs processing of generating stroke data in response to the operation.

The acquisition unit 22B is enabled by the instruction from the CPU 201, and acquires data stored in the storage unit 2000.

The conversion unit 22X is enabled by the instruction from the CPU 201, and performs processing of converting various data. This conversion may include converting into text, actual data (binary) conversion, serialization, deserialization, encoding, decoding or the like.

The superposition unit 22Y is enabled by the instruction from the CPU 201, and performs processing of generating image layers based on respective data and superposing the layers.

The page processing unit 22Z merges stroke data and display data into a piece of page data and stores it into a page data storage unit 220 which is a part of the storage unit 2000.

The page data storage unit 220 is structured in a part of the storage unit 2000, and stores page data, as shown in Table 1. Table 1 is a conceptual diagram depicting page data. The page data are data for one page displayed on the display device 3 (stroke array data (respective stroke data) and media data).

TABLE 1

| PAGE DATA ID | START TIME | ENDING TIME | STROKE ARRAY DATA ID | MEDIA DATA ID |
|---|---|---|---|---|
| s001 | 20150522152034 | 20150522152402 | st001 | m001 |
| s002 | 20150522152415 | 20150522152825 | st002 | m002 |
| s003 | 20150522153345 | 20150522154033 | st003 | m003 |
| ... | ... | ... | ... | ... |

The page data stores a page data ID for identifying an arbitrary page, a start time indicating time when the display of the page starts, an ending time indicating time when alteration of content of the page by stroke, gesture or the like ends, a stroke array data ID for identifying stroke array data generated by a stroke by the electronic pen 4 or the user's hand H, and a media data ID for identifying media data, in association with each other. The stroke array data are data by which the stroke image is displayed on the display device 3. The media data are data by which another image superposed with the stroke image is displayed on the display device 3.

Moreover, the stroke array data indicate detailed information, as shown in Table 2 in FIG. 16. Table 2 is a conceptual diagram depicting the stroke array data. As shown in Table 2, a piece of stroke array data is expressed by a plurality of pieces of stroke data. Then, a piece of stroke data indicates a stroke data ID for identifying the stroke data, a start time indicating time when writing of one stroke starts, a ending time indicating time when the writing of one stroke ends, a color of the stroke, a width of the stroke, and a coordinate array data ID for identifying an array of a pass point of the stroke. For example, when the user writes an alphabetic character "S" with the electronic pen 4, the drawing is a single stroke, and one alphabetic character "S" is shown with one stroke data ID. On the other hand, when the user writes an alphabetic character "T" with the electronic pen 4, the drawing includes two strokes, and one alphabetic character "T" is shown with two stroke data IDs.

Furthermore, the coordinate array data indicate detailed information as shown in Table 3 in FIG. 17. Table 3 is a conceptual diagram depicting the coordinate array data. The coordinate array data indicates respective pieces of information of a point on the display device 3 (X-coordinate value, Y-coordinate value), difference time when passing through this point from the start time of the stroke (ms), and a writing pressure of the electronic pen 4 at this point. That is, a set of points shown in Table 3 is indicated by a coordinate array data shown in Table 2. For example, when the user draws an alphabetic character "S" with the electronic pen 4, the drawing is a single stroke. Because it passes through a plurality of pass points until the drawing of "S" ends, the coordinate array data indicate information on the plurality of pass points.

Moreover, the media data, among the page data shown in Table 1, indicate detailed information as shown in Table 4. Table 4 is a conceptual diagram depicting the media data. As shown in FIG. 9, the media data indicate a media data ID in the page data shown in Table 1, a data category of the media data, storage time at which the media data is stored, a position (X-coordinate value, Y-coordinate value) of an image displayed on the display device 3 by the media data and a size of the image (width, height), and data indicating content of the media data, in association with each other. Among them, the position of the image displayed on the display device 3 by the media data indicates a position of an upper left end of the image displayed by the media data where the coordinate of an upper left end of the display device 3 is (X-coordinate value, Y-coordinate value)=(0, 0).

TABLE 4

| MEDIA DATA ID | DATA CATEGORY | STORAGE TIME | X-COORDINATE VALUE | Y-COORDINATE VALUE | WIDTH | HEIGHT | DATA |
|---|---|---|---|---|---|---|---|
| m001 | IMAGE | 20150522152632 | 0 | 0 | 1920 | 1080 | abc.jpg |
| m002 | IMAGE | 20150522153002 | 277 | 156 | 1366 | 768 | bcd.jpg |
| m003 | IMAGE | 201505221544217 | 277 | 156 | 1366 | 768 | cde.jpg |
| ... | ... | ... | ... | ... | ... | ... | ... |

((Functional Configuration of Server Part 90))

The server part 90 includes a communication control unit 91.

The communication control unit 91 is enabled by the instruction from the CPU 201, and controls communication between the communication control unit 21 in the client part 20 in the same electronic whiteboard 2 and a communication control unit 21 in a client part 20 in the other electronic whiteboard 2 via the communication network 9a.

((Functional Configuration of Client Part 80))

A communication control unit 81 of the client part 80 is enabled by the instruction from the CPU 201 or 801, or the network controller 205 or the network I/F 811, and controls communication with a communication control unit 81 in a client part 80 of the other communication terminal.

A display control unit 82 of the client part 80 is enabled by the instruction from the CPU 801 by starting the communication application B11. The display control unit 82 performs a control to perform image processing based on data acquired from the communication control unit 21, the storage unit 8000 or the like, and to output an image.

<<Process or Operation of Embodiments>>

Subsequently, with reference to FIGS. 8 to 11, a process or an operation according to the embodiment will be described. FIGS. 8 to 11 are sequence diagrams depicting processes of the electronic whiteboard or the PC.

(Communication Establishment Process Between Electronic Whiteboards)

With reference to FIG. 8, a process of establishing communication among the electronic whiteboards 2a, 2b and 2c by the communication application A11 will be described. When the user turns the power switch 226 of the electronic whiteboard 2a ON, the communication application A11 starts and the process of the client part 20 of the electronic whiteboard 2a starts (step S1). Then, when a request for hosting a conference is accepted by an operation on the display device 3a, an instruction to start the process of the client part 90 is output from the communication control unit 21 of the client part 20 to a communication control unit 91 in the server part 90 of the same electronic whiteboard 2a. Therefore, in the electronic whiteboard 2a, not only the client part 20 but also the server part 90 become capable of starting various processes (step S2).

Next, the communication control unit 91 of the electronic whiteboard 2a generates connection information for establishing a connection to the electronic whiteboard 2a, and the client part 20 displays the generated connection information on the display device 2a (step S3). The connection information includes an IP address of the host apparatus and a passcode that is generated for this remote sharing processing. This passcode is stored in the storage unit 2000. Then, the connection information is transferred to users of the electronic whiteboards 2b, 2c via telephone or electronic mail by the user of the electronic whiteboard 2a.

Next, in the electronic whiteboards 2b, 2c, when the user turn the power switch 226 of the electronic whiteboard 2b or 2c ON, the communication application A11 starts and the process of the client part 20 of the electronic whiteboard 2b or 2c starts (steps S4, S5). In the electronic whiteboards 2b, 2c, when an input of the connection information is accepted by an operation on the display device 3b or 3c, the communication control unit 21 in the client part 20 of each of the electronic whiteboards 2b, 2c, based on an IP address of the connection information, via the communication network 9a, sends a passcode to the communication control unit 91 in the server part 90 of the electronic whiteboard 2a, to perform a participation request (steps S6, S7). The communication control unit 91 of the electronic whiteboard 2a receives the participation request (including the passcode) from each of the electronic whiteboards 2b, 2c.

Next, the communication control unit 91 authenticates the passcode received from each of the electronic whiteboards 2b, 2c using a passcodes managed in the storage unit 2000 (step S8). Then, the communication control unit 91 reports a result of authentication to the client part 20 of each of the electronic whiteboards 2b, 2c (steps S9, S10). When each of the electronic whiteboards 2b, 2c is determined to be a valid electronic whiteboard by the authentication of step S8, a communication of remote sharing processing is established between the electronic whiteboard 2a that is a host apparatus and the electronic whiteboards 2b, 2c that are participant apparatuses (steps S11, S12). In the present embodiment, an example where content data sent among the electronic whiteboards 2a, 2b and 2c include stroke data will be described.

(Communication Establishment Process Between Electronic Whiteboard and PC)

With reference to FIG. 9, a process of establishing communication between the electronic whiteboard 2c and the PC 8 by the communication applications B10, B11 will be described.

When the client part 20 accepts a start request for the communication application B10 by an operation on the display device 3c of the electronic whiteboard 2c, the client part 80 becomes capable of starting various processes (step S21).

Subsequently, the communication control unit 81 of the client part 80 performs login request to the management apparatus 50 (step S22). Therefore, the management apparatus receives the login request.

The management apparatus 50 authenticates the electronic whiteboard 2c that is a login request source (step S23), and sends a result of authentication to the electronic whiteboard 2c that is a login request source (step S24). Therefore, the communication control unit 81 of the electronic whiteboard 2c receives the result of authentication. In the following, an example where it is determined to be a valid login request source by step S23 will be described.

In the PC 8, based on an operation of the keyboard 821 or the mouse 822, a start request for the communication application B11 is accepted, the communication application B11 starts, and the process of the client part 80 of the PC 8 becomes capable of starting (step S31).

Subsequently, the communication control part 81 of the client part 80 performs a login request to the management apparatus 50 (step S32). Then, the management apparatus 50 receives the login request.

The management apparatus 50 authenticates the PC 8 that is a login request source (step S33), and sends a result of authentication to the PC 8 (step S34). In the following, an example where it is determined to be a valid login request source in step S33 will be described.

The communication control part 81 of the electronic whiteboard 2c, in response to an operation on the display device 3c, performs a request to start communication for the management apparatus 50 (step S41). The request to start communication includes a communication ID of the electronic whiteboard 2c that is a request source to start communication, and a communication ID of the PC 8 that is a destination. Then, the management apparatus 50 receives the request to start communication. The communication ID is information for identifying a communication destination, and includes identification information of a communication terminal or an account of a user of the communication terminal.

Next, the management apparatus 50 performs a request to start communication for the PC 8 that is the destination (step S42). The request to start communication includes a communication ID of the electronic whiteboard 2c that is the request source to start communication sent in step S41, and the communication ID of the PC 8 that is the destination. Then, the PC 8 that is the destination receives the request to start communication.

On the other hand, the communication control unit 81 of the PC 8, in response to an operation input by the user, sends to the management apparatus 50 information indicating whether to respond (step S43). In the following, an example where the PC 8 sends to the management apparatus 50 information indicating to respond will be described.

Then, the management apparatus 50 receives the information indicating to respond.

The management apparatus 50 sends the information to respond, sent from the PC 8 that is the destination in step S13, to the electronic whiteboard 2c that is a request source to start (step S44). Then, the the communication control unit 81 of the electronic whiteboard 2c receives the information indicating to respond.

Subsequently, the management apparatus 50 controls to establish a communication for sending content data between the electronic whiteboard 2c and the PC 8 via the communication network 9b (step S45). A method for establishing communication is not limited in particular, but includes, for example, when a relay apparatus 30 for relaying content data is arranged in the communication network 9b, a method of sending connection information for connecting to the relay apparatus to the electronic whiteboard 2c and the PC 8, by the management apparatus 50. Moreover, the management apparatus 50 may send to the relay apparatus 30 a request to start relaying content data between the electronic whiteboard 2c and the PC 8. Based on the above-described control, the communication between the electronic whiteboard 2c and the PC 8 is established (step S46). Therefore, the electronic whiteboard 2c and the PC 8 become capable of sending/receiving content data to/from a communication partner. In the present embodiment, an example where the content data sent between the electronic whiteboard 2c and the PC 8 include display data (video data or still image data) of conference material will be described.

(Displaying Superposed Image)

Subsequently, with reference to FIG. 10, a process of displaying a superposed image in the remote sharing processing will be described.

At first, when a user of the electronic whiteboard 2b draws a stroke image on the electronic whiteboard 2b using the electronic pen 4b, the stroke processing unit 22A, based on a coordinate position of a contact part of the electronic pen 4b and the display device 3b, generates stroke data of the drawn stroke (step S61). The generated stroke data include the respective parameters shown in Tables 1 to 3. The conversion unit 22X merges stroke data in a plurality of stroke units, and thereby serializes them (step S62). The communication control unit 21 of the electronic whiteboard 2b sends the serialized stroke data to the communication control unit 91 of the electronic whiteboard 2a that is a host apparatus via the communication network 9a (step S63). The electronic whiteboard 2b may send stroke data in series to the electronic whiteboard 2a that is the host apparatus each time the drawing is performed.

The communication control unit 91 of the electronic whiteboard 2a, upon receiving the stroke data sent from the electronic whiteboard 2b, sends the stroke data to the client part 20 of the electronic whiteboard 2a. The sent stroke data is received by the communication control unit 21 of the client part 20 of the electronic whiteboard 2a. The conversion unit 22X in the drawing control unit 22 of the client part 20 deserializes the stroke data (step S64). The deserialized stroke data are stored in the page data storage unit 220 by the page processing unit 22Z. Subsequently, the superposition unit 22Y, based on data stored in the page data storage unit 220, generates a layer of a stroke image (B) after combining data in stroke units, a layer of a UI image (A), a layer of an output image (C), and a layer of a background image (D). Then, the superposition unit 22Y superposes the respective generated layers, and displays the superposed images (A, B, C, and D) on the display device 3a (step S65). The layer of the stroke image (B) is generated based on the stroke data that are deserialized according to the above-described process and stored in the page data storage unit 220. The layer of the output image (C) is generated based on media data stored in the page data storage unit 220. The layer of the UI image (A) and the background image (D) are generated based on data stored in advance in the storage unit 2000. FIG. 15A is a diagram depicting an example of display on the display device in step S65.

Moreover, the communication control unit 91 of the electronic whiteboard 2a sends the serialized stroke data sent from the electronic whiteboard 2b to the client parts 20 of the electronic whiteboards 2b, 2c (steps S66, S67). The sent stroke data are received by the communication control units 21 of the client parts 20 of the electronic whiteboards 2b, 2c. The client parts 20 of the electronic whiteboards 2b, 2c display the superposed images (A, B, C, and D) including the stroke data sent from the electronic whiteboard 2a on the display devices 3b, 3c. This process is the same as the process in the client part 20 of the electronic whiteboard 2a in steps S64, S65, and an explanation thereof will not be provided (steps S68 to S71). The process in drawing a stroke image in the electronic whiteboards 2a, 2c is the same as the process in steps S61 to S71 except that the client part 20 of the electronic whiteboard 2b is substituted by the client parts 20 of the electronic whiteboards 2a, 2c, and an explanation thereof will not be provided.

(Displaying of Output Image)

Subsequently, with reference to FIG. 11, a process of displaying the output image (C) in the remote sharing processing will be described.

The display control unit 82 of the PC 8 incorporates a screen of conference material displayed on the display unit 820, to acquire display data (step S81). The communication control unit 81 of the PC 8 sends the acquired display data to the client part 80 of the electronic whiteboard 2c via the relay apparatus 30 (step S82). The display data sent by the PC 8 are received by the communication control unit 81 of the electronic whiteboard 2c. The communication control unit 81 of the electronic whiteboard 2c stores the received display data into the storage unit 2000.

The acquisition unit 22B of the client part 20 of the electronic whiteboard 2c acquires display data stored in the storage unit 2000 (step S83). The conversion unit 22X of the client part 20 of the electronic whiteboard 2c converts the display data acquired by the acquisition unit 22B, such as a PDF file, into a text format, as a format that can be sent by the communication application A11 (step S84). The conversion unit 22X serializes the display data that are converted in the text format (step S85). The communication control unit 21 of the electronic whiteboard 2c sends the serialized display data to the communication control unit 91 of the electronic whiteboard 2a that is the host apparatus via the communication network 9a (step S86).

The communication control unit 91 of the electronic whiteboard 2a, upon receiving the display data sent from the electronic whiteboard 2c, sends the display data to the client part 20 of the electronic whiteboard 2a. The sent display data are received by the communication control unit 21 of the client part 20 of the electronic whiteboard 2a. The conversion unit 22X in the drawing control unit 22 of the client part 20 deserializes the display data (step S87). Furthermore, the deserialized display data are converted into actual data (binary) by the conversion unit 22X. The obtained actual data are stored in the page data storage unit 220 as media data by the page processing unit 22Z (step S88). Subsequently, the superposition unit 22Y, based on data stored in the page data storage unit 220, creates a layer of an output image (C) based on the display data, a layer of a stroke image (B), a layer of a UI image (A) and a layer of a background image (D). The superposition unit 22Y superposes the created layers, and displays the superposed images (A, B, C and D) on the display device 3a (step S89). The layer of the output image (C) is generated based on the media data that are converted into actual data according to the above-described process and stored in the page data storage unit 220. The superposition unit 22Y superposes the layer (B) of the stroke image on the layer of the output image (C), and thereby outputs the display data without disturbing the output of the stroke data. FIG. 15B is a diagram depicting an example of display on the display device in step S89.

Moreover, the communication control unit 91 of the electronic whiteboard 2a sends the serialized display data sent from the electronic whiteboard 2c to the client parts 20 of the electronic whiteboards 2b, 2c (steps S90, S91). The sent display data are received by the communication control units 21 of the client parts 20 of the electronic whiteboards 2b, 2c. The client parts 20 of the electronic whiteboards 2b, 2c display the superposed images (A, B, C, and D), including the display data sent from the electronic whiteboard 2a as an output image (B), on the display devices 3b, 3c. This process is the same as the process in the client part 20 of the electronic whiteboard 2*a* in steps S87 to S89, and an explanation thereof will not be provided (steps S92 to S97).

<<First Variation of the Embodiment>>

Subsequently, regarding a first variation of the embodiment, a difference from the embodiment will be described. In the first variations the display control unit 82 of the PC 8 has a function of controlling display of stroke data drawn by an operation of the mouse 822.

FIG. 12 is a sequence diagram depicting processing of the electronic whiteboard or the PC. When the user of the PC 8 draws a stroke image using the mouse 822, the display control unit 82 generates stroke data corresponding to the stroke image (step S100). The stroke data include the respective parameters in Tables 1 to 3. The communication control unit 81 of the PC 8 sends the stroke data to the client part 80 of the electronic whiteboard 2*c* via the communication network 9*b* (step S101).

The sent stroke data are received by the communication control unit 81 of the client part 80 of the electronic whiteboard 2*c*. Each time the stroke data are received, the received stroke data are stored in the storage unit 2000 by the communication control unit 81. The acquisition unit 22B of the client part 20 of the electronic whiteboard 2*c* acquires stroke data in stroke units stored in the storage unit 2000 (step S102). The conversion unit 22X of the client part 20 of the electronic whiteboard 2*c* serializes the stroke data in a plurality of stroke units acquired by the acquisition unit 22B into a format that can be sent by the communication control unit 21 (step S103). The communication control unit 21 of the electronic whiteboard 2*c* sends data of the serialized stroke image to the communication control unit 91 of the electronic whiteboard 2*a* that is the host apparatus via the communication network 9*a* (step S104).

The communication control unit 91 of the electronic whiteboard 2*a*, upon receiving the stroke data sent from the electronic whiteboard 2*c*, delivers the stroke data to the respective client parts 20 of the electronic whiteboards 2*a*, 2*b* and 2*c*, and thereby shares the stroke image among the electronic whiteboards 2*a*, 2*b* and 2*c*. This process is the same as the process in steps S64 to S71, and a detailed explanation thereof will not be provided (steps S105 to S112).

<<Second Variation of the Embodiment>>

Next, regarding a second variation of the embodiment, a difference from the embodiment will be described. In the second variation, a process of sending the stroke data generated in the electronic whiteboard 2*b* to the PC 8 will be described.

FIG. 13 is a sequence diagram depicting a process of the electronic whiteboard and the PC. According to the process in steps S61 to S71 in the embodiment, the stroke data generated in the electronic whiteboard 2*b* are delivered to the electronic whiteboard 2*c*. Then, the stroke data delivered to the electronic whiteboard 2*c* are deserialized, and then stored in the storage unit 2000 by the communication control unit 21 of the client part 20.

The stroke data stored in the storage unit 2000 are acquired by the communication control unit 81 of the client part 80, and sent to the client part 80 of the PC 8 (step S121). The stroke data are received by the communication control unit 81 of the client part 80 of the PC 8. The received stroke data are displayed on the display unit 820 by the display control unit 82 of the client part 80 of the PC 8 (step S122).

<<Third Variation of the Embodiment>>

Next, regarding a third variation of the embodiment, a difference from the embodiment will be described. In the third variation, a case where the display data sent between the PC 8 and the electronic whiteboard 2*c* are video data will be described.

FIG. 14 is a sequence diagram depicting a process of the electronic whiteboard or the PC. The communication control unit 81 of the PC 8 sends video data of a conference participant captured by the camera 812 to the client part 80 of the electronic whiteboard 2*c* as streaming data (step S140). The video data are received by the communication control unit 81 of the electronic whiteboard 2*c*.

The communication control unit 81 of the client part 80 of the electronic whiteboard 2*c* stores the received video data into the storage unit 2000. The acquisition unit 22B of the client part 80 of the electronic whiteboard 2*c* acquires video data stored in the storage unit 2000 (step S141). The conversion unit 22X of the client part 20 of the electronic whiteboard 2*c* performs rendering for the video data acquired by the acquisition unit 22B, and thereby generates respective frame data as still image data (step S142). The conversion unit 22X of the client part converts the respective frame data into text (step S143), and serializes them (step S144). The communication control unit 21 of the client part, each time the respective serialized frame data are generated, sends the generated frame data to the server part 90 of the electronic whiteboard 2*a* as display data (step S145).

The sent display data are received by the communication control unit 91 of the server part 90 of the electronic whiteboard 2*a*. The communication control unit 91 of the server part 90 of the electronic whiteboard 2*a*, each time display data are sent from the electronic whiteboard 2*c*, delivers the sent display data to the respective client parts 20 of the electronic whiteboards 2*a*, 2*b* and 2*c*. In the client parts 20 of the respective electronic whiteboards 2*a*, 2*b* and 2*c*, each time display data are delivered from the electronic whiteboard 2*a*, the delivered display data are displayed as a superposed image (steps S146 to S156). This process is the same as the process of steps S87 to S97, and a detailed explanation will not be provided. Because the delivered display data are still image data of respective frames of the video, by displaying the display data continuously, the video on the side of the PC 8 can be reproduced in the electronic whiteboards 2*a*, 2*b* and 2*c*.

If it is possible to send video data in a predetermined format by the communication application A11, the client part 20 of the electronic whiteboard 2*c* may encode the video data sent from the PC 8 into the predetermined format, and send them to the server part 90 of the electronic whiteboard 2*a*. The server part 90 of the electronic whiteboard 2*a* delivers the video data that are sent from the electronic whiteboard 2*c* and encoded in the predetermined format to the client parts 20 of the electronic whiteboards 2*a*, 2*b* and 2*c*. The client parts 20 of the electronic whiteboards 2*a*, 2*b* and 2*c* may decode the video data sent from the server part 90 and reproduce as a motion picture.

<<Main Effect of the Embodiment>>

According to the communication control method in the embodiments, the communication control unit 21 (an example of a first communication control means) of the client part 20 of the electronic whiteboard 2*c* (an example of a communication terminal) controls a communication with the electronic whiteboard 2*b* (an example of a first communication terminal) via the server part 90 (an example of a delivery server) of the electronic whiteboard 2*a* (a first communication control process). The communication control unit 81 (an example of a second communication control means) of the client part 80 of the electronic whiteboard 2*c* controls a communication with the PC 8 (an example of a second communication terminal) (a second communication control process). The acquisition unit 22B (an example of an acquisition means) of the electronic whiteboard 2c acquires content data sent in the communication with the PC 8 by the communication control unit 81 (an acquisition process). A superposition unit 22Y (an example of a display control means) of the drawing control unit 22 of the electronic whiteboard 2c controls a display of an image based on the content data delivered by the server part 90 of the electronic whiteboard 2a (a display control process). The communication control unit 21 (an example of the first communication control means) of the electronic whiteboard 2c (an example of the communication terminal) sends the content data acquired by the acquisition unit 22B to the server part 90 of the electronic whiteboard 2a. In the embodiment, both a display of the content data sent between the communication terminals by the client part 20 and a display of the content data sent between the communication terminals by the client part 80 can be controlled on the side of the client part 20. That is, according to the embodiment, when a plurality of applications A11 and B10 for sharing an image between the communication terminals have been started, it is possible to prevent an image displayed by one application A11 from becoming difficult to be viewed with the display control by the other application B10.

The content data delivered by the server part 90 of the electronic whiteboard 2a include stroke data (an example of first content data) sent by the electronic whiteboard 2b and display data (an example of second content data) acquired by the acquisition unit 22B and sent to the server part 90 of the electronic whiteboard 2a. The super-position unit 22Y performs a control of superposing the stroke data and the display data and displaying them. Therefore, it becomes possible to view the stroke data and the display data simultaneously.

According to the first variation of the embodiment, both the content data sent by the client part 20 and the content data sent by the client part 80 may be stroke data. Therefore, even when stroke data cannot be directly sent between the client part 20 and the client part 80, it becomes possible to share stroke data between the communication terminals.

According to the embodiment, the content data sent by the client part 20 are different from the content data sent by the client part 80. The conversion unit 22X (an example of a conversion means) converts the display data sent by the client part 80 into text, to convert into a format that can be sent in the communication by the client part 20. Therefore, even when the content data sent by the client part 20 are different from the content data sent by the client part 80, it becomes possible to share the content data between the communication terminals.

According to the third variation of the embodiment, the content data sent by the client part 80 are video data. In this case, the conversion unit 22X converts video data sent by the client part 80 to/from the PC 8 by rendering into data of a plurality of still images that can be sent in the communication by the client part 20. Subsequently, the server part 90 of the electronic whiteboard 2a delivers the data of the plurality of still images, and thereby a motion picture can be reproduced in the electronic whiteboard 2 that is a destination of delivery.

The conversion unit 22X (an example of a serialization means) of the electronic whiteboard 2c serializes content data to be sent to the server part 90 of the electronic whiteboard 2a. Moreover, the conversion unit 22X (an example of a deserialization means) of the electronic whiteboard 2c deserializes the content data delivered by the server part 90 of the electronic whiteboard 2a. Therefore, a load of serializing and deserializing content data on the server side can be reduced.

The communication control unit 81 of the electronic whiteboard 2c sends the content data delivered by the server part 90 of the electronic whiteboard 2a to the PC 8. Therefore, it becomes possible to share content data on the side of the electronic whiteboard 2 with the PC 8.

<<Supplement to the Embodiment>>

The communication applications A11, B10 and B11 may be stored in a recording medium readable by a computer and distributed as files with an installable format or an executable format. Moreover, the other example of the above-described recording medium includes CD-R (Compact Disc Recordable), DVD (Digital Versatile Disk), Blu-ray disk or the like. Moreover, the above-described recording medium or a HD (Hard Disk) storing these programs can be provided within the country or outside the country as a program product.

Moreover, the electronic whiteboard 2, the PC 8, the relay apparatus 30, and the management apparatus 50 may be configured by a single apparatus or may be configured by a plurality of apparatuses to which the respective units (functions or means) that are divided are arbitrarily assigned.

Moreover, in the above descriptions, the electronic whiteboard 2 and the PC 8 are described as an example of the apparatus that can share an image. However, the present invention is not limited to this. For example, as the apparatus that can share an image, another apparatus that can be equipped with the respective functions, which the above-described electronic whiteboard 2 and the PC 8 have, may be used. The other apparatus includes, for example, a video conference terminal, a projector, a digital signage unit, a text sharing apparatus, a car navigation terminal, a gaming machine, a PDA (Personal Digital Assistant), a remote diagnosis apparatus or the like.

Although the present invention has been described with reference to embodiments, the present invention is not limited to these embodiments, but various variations and modifications may be made without departing from the scope of the invention as set forth in the accompanying claims.

The present application is based on and claims the benefit of priority of Japanese Priority Application No. 2015-109871 filed on May 29, 2015, the entire contents of which are hereby incorporated by reference.

INDUSTRIAL APPLICABILITY

The present invention can be applied to a communication terminal, a communication system, a communication control method and a program.

REFERENCE SIGNS LIST

1 communication system
2 electronic whiteboard
3 display device
4 electronic pen
5 USB memory
6 laptop PC
8 PC
9a,9b communication network
20 client part
21 communication control unit
22 drawing control unit 22A stroke processing unit
22B acquisition unit
22X conversion unit
22Y superposition unit
22A page processing unit
220 page data storage unit
30 relay apparatus
50 management apparatus
80 client part
81 communication control unit
82 display control unit
90 server part
91 communication control unit
2000 storage unit
8000 storage unit

The invention claimed is:

1. A communication terminal, comprising:
processing circuitry configured to
execute a first communication application to control a communication between the communication terminal and a first communication terminal via a delivery server;
execute a second communication application to control a communication between the communication terminal and a second communication terminal, wherein the second communication application is not provided with an image processing function for outputting display data;
acquire content data transmitted to the communication terminal from the second communication terminal in the communication controlled by the second communication application, wherein the first communication application sends the acquired content data to the delivery server; and
control a display of an image based on display content data delivered by the delivery server,
wherein the display content data delivered by the delivery server include first content data sent by the first communication terminal and second content data based on the acquired content data received from the second communication terminal and sent to the delivery server, and
wherein the processing circuitry is further configured to perform a control of superposing a layer of the first content data and a layer of the second content data to generate a superposed layer of content data and displaying the superposed layer of content data.

2. The communication terminal according to claim 1, wherein the first content data include first stroke data and the second content data include second stroke data.

3. The communication terminal according to claim 1, wherein the processing circuitry is further configured to convert the second content data into data with a format that can be sent in the communication controlled by the first communication application, and
wherein the first content data are different from the second content data.

4. The communication terminal according to claim 3, wherein the processing circuitry is further configured to convert video data transmitted between the communication terminal and the second communication terminal in the communication controlled by the second communication application into data of a plurality of still images that can be sent in the communication controlled by the first communication application, and
wherein the second content data include video data.

5. The communication terminal according to claim 1, wherein the processing circuitry is further configured to:
serialize the content data sent to the delivery server; and
deserialize the display content data delivered by the delivery server.

6. The communication terminal according to claim 1, wherein the second communication application sends the display content data delivered by the delivery server to the second communication terminal.

7. A communication system comprising:
the communication terminal according to claim 1;
the first communication terminal;
the second communication terminal; and
the delivery server.

8. The communication system according to claim 7, wherein the first communication terminal is configured to execute the first communication application, and
wherein the second communication terminal is configured to execute the second communication application.

9. A communication control method for controlling a communication of a communication terminal, the method comprising:
controlling, using a first communication application, a first communication between the communication terminal and a first communication terminal via a delivery server;
controlling, using a second communication application, a second communication between the communication terminal and a second communication terminal, wherein the second communication application is not provided with an image processing function for outputting display data;
acquiring content data transmitted in the second communication to the communication terminal from the second communication terminal;
sending the acquired content data transmitted in the second communication to the delivery server in the first communication; and
controlling a display of an image based on display content data delivered by the delivery server,
wherein the display content data delivered by the delivery server include first content data sent by the first communication terminal and second content data based on the acquired content data received from the second communication terminal and sent to the delivery server, and
wherein the controlling step further includes superposing a layer of the first content data and a layer of the second content data to generate a superposed layer of content data and displaying the superposed layer of content data.

10. The communication terminal of claim 1, wherein the processing circuitry is configured to execute the first communication application, which includes the image processing function for outputting display data.

11. The communication terminal of claim 1, wherein the first and second communication applications have different communication protocols.

12. The communication terminal of claim 1, wherein the processing circuitry includes:
a first client unit including a first communication control unit executing the first communication application; and
a second client unit including a second communication control unit executing the second communication application.

13. The communication terminal of claim 12,
wherein the first communication control unit communicates with the first communication terminal via a first communication network and the delivery server, and
wherein the second communication control unit communicates with the second communication terminal via a second communication network.

\* \* \* \* \*